(12) United States Patent
Nakajima

(10) Patent No.: US 7,236,678 B2
(45) Date of Patent: Jun. 26, 2007

(54) OPTICAL FIBER ARRAY, OPTICAL FIBER POSITIONING METHOD AND OPTICAL FIBER POSITIONING PLATE

(75) Inventor: Toshihiro Nakajima, Kanagawa (JP)

(73) Assignee: Yamaha Corporation, Hamamatsu-shi (JP)

( * ) Notice: Subject to any disclaimer, the term of this patent is extended or adjusted under 35 U.S.C. 154(b) by 0 days.

(21) Appl. No.: 11/409,027

(22) Filed: Apr. 24, 2006

(65) Prior Publication Data

US 2006/0198596 A1    Sep. 7, 2006

Related U.S. Application Data

(63) Continuation of application No. 10/200,407, filed on Jul. 23, 2002.

(30) Foreign Application Priority Data

| Jul. 23, 2001 | (JP) | ............... 2001-221934 |
| Aug. 8, 2001 | (JP) | ............... 2001-241180 |
| Mar. 18, 2002 | (JP) | ............... 2002-074843 |

(51) Int. Cl.
*G02B 6/00* (2006.01)
*G02B 6/36* (2006.01)

(52) U.S. Cl. ............... 385/137; 385/139; 385/147

(58) Field of Classification Search .......... None
See application file for complete search history.

(56) References Cited

U.S. PATENT DOCUMENTS

| 4,812,002 A | * | 3/1989 | Kato et al. ............... 385/33 |
| 5,135,590 A | * | 8/1992 | Basavanhally et al. ....... 156/64 |
| 5,185,846 A | * | 2/1993 | Basavanhally et al. ..... 385/137 |
| 5,566,262 A | * | 10/1996 | Yamane et al. ............. 385/33 |
| 6,137,930 A | | 10/2000 | Laughlin |
| 6,470,123 B1 | * | 10/2002 | Sherman et al. ........... 385/115 |
| 6,629,780 B2 | * | 10/2003 | Kang et al. .................. 385/60 |
| 6,766,085 B2 | * | 7/2004 | Fouquet et al. ............. 385/52 |
| 6,773,166 B2 | | 8/2004 | Trezza et al. |
| 2002/0154882 A1 | * | 10/2002 | Moran ..................... 385/137 |
| 2004/0028344 A1 | * | 2/2004 | Kang et al. .................. 385/60 |
| 2004/0042732 A1 | * | 3/2004 | Bruns ......................... 385/71 |

FOREIGN PATENT DOCUMENTS

| JP | 62-231907 | | 10/1987 |
| JP | 63281107 A | * | 11/1988 |
| JP | 04288507 A | * | 10/1992 |
| JP | 08160242 A | * | 6/1996 |
| JP | 09203822 A | * | 8/1997 |
| JP | 10268145 A | * | 10/1998 |
| JP | 11072644 A | * | 3/1999 |
| JP | 2001241180 A | * | 9/2001 |

OTHER PUBLICATIONS

Japanese Office Action re Japanese Application No. JP 2002-166707 dated Jun. 14, 2005.*
Japanese Office Action re Japanese Application No. JP 2002-144420 dated Jun. 14, 2005.*

* cited by examiner

*Primary Examiner*—Sung Pak
(74) *Attorney, Agent, or Firm*—Dickstein, Shapiro, LLP.

(57) ABSTRACT

An optical fiber positioning method comprises the steps of: preparing an optical fiber, an optical fiber holder, and a positioning plate; fitting the optical fiber holder in the fitting hole and inserting the optical fiber into an optical fiber holding hole of the optical fiber holder and an optical fiber positioning hole of the optical fiber positioning plate; abutting the optical fiber on the abutting position of the optical fiber positioning hole in the state that the end of the optical fiber holder is fitted in the fitting hole and the optical fiber is inserted into an optical fiber holding hole of the optical fiber holder and an optical fiber positioning hole of the optical fiber positioning plate; and fixing the optical fiber to the optical fiber positioning plate in the state that the optical fiber is abutted on with the abutting position of an optical fiber positioning hole.

8 Claims, 24 Drawing Sheets

US 7,236,678 B2

OPTICAL FIBER ARRAY, OPTICAL FIBER POSITIONING METHOD AND OPTICAL FIBER POSITIONING PLATE

CROSS REFERENCE TO RELATED APPLICATIONS

This application is a continuation of U.S. application Ser. No. 10/200,407, filed Jul. 23, 2002, which is based on Japanese Patent Application No. 2001-221934, filed on Jul. 23, 2001, Japanese Patent Application No. 2001-241180, filed on Aug. 8, 2001, and Japanese Patent Application No. 2002-074843, filed on Mar. 18, 2002, and the entire contents of those applications are incorporated herein by reference.

BACKGROUND OF THE INVENTION

A) Field of the Invention

The present invention relates to optical transmission path forming techniques using optical fibers, and more particularly to an optical fiber array, an optical fiber positioning method to be used for manufacture of an optical fiber array, and an optical fiber positioning plate to be used for the optical fiber positioning method.

B) Description of the Related Art

As a centering method for a ferrule (optical fiber holder), the positions of optical fiber holding holes have been determined conventionally by using the outer periphery of an optical fiber holder as a reference position. A multi optical fiber holder adopting such a centering method is known such as shown in FIG. 43 (for example, refer to the Official Gazette JP-A-HEI-11-712644).

A multi optical fiber holder 1 shown in FIG. 43 has a first recess 2 and a second recess 3 in the upper part of the rectangular body of the holder 1. The first recess 2 is formed spaced apart by a predetermined distance from the end face 1A. The second recess 3 is continuous with and deeper than the first recess 2. Optical fiber positioning holes 1a to 1d are formed in line through the body of the holder between the end face 1A and first recess 2. Optical fiber alignment grooves 4a to 4d of a C-character cross section are juxtaposed on the bottom of the recess 2 and reach the recess 3. Each optical fiber alignment groove has a region 5a as shown in the groove 4a near the recess 3, the region 5a increasing its diameter toward the recess 3. On opposite sides of the end face 1A, guide pin holes $G_1$ and $G_2$ are formed along the row of the positioning holes 1a to 1d.

A multi optical fiber 6 has optical fibers 8a to 8d covered with a sheath 7. When the multi optical fiber 6 is assembled with the multi optical fiber holder 1, part of the sheath 7 is cut to expose the optical fibers 8a to 8d. The optical fibers 8a to 8d are inserted from the recess 3 side of the holder 1 into the positioning holes 1a to 1d via the alignment grooves 4a to 4d to project the ends of the optical fibers 8a to 8d out of the positioning holes 1a to 1d and sit the sheath 7 on the recess 3. In this state, adhesive is flowed in the alignment grooves 4a to 4d to fix the optical fibers 8a to 8d to the positioning holes 1a to 1d.

According to this prior art, the positions of optical fibers relative to the outer periphery of the optical fiber holder are determined by the positioning holes 1a to 1d. Therefore, the size and position of each positioning hole 1a to 1d are required to have high precision. The pitch of positioning holes of the multi optical fiber holder is also required to have high precision.

A two-dimensional optical fiber array is know such as shown in FIG. 44 (for example, refer to the Official Gazette of JP-A-HEI-10-268145).

In a two-dimensional optical fiber array shown in FIG. 44, holes H1, H2, H3, . . . are formed through a ceramic plate 1a by precision laser work. Such ceramic plates 1b, 1c, . . . are prepared. Guide lines are inserted into a plurality of holes H1, H2, H3, . . . to align hole positions and stack and fix the ceramic plates 1a, 1b, 1c, . . . After the guide lines are pulled out of the holes, optical fibers 2a, 2b, 2c, . . . are inserted into the holes H1, H2, H3, . . . and fixed. The ends of the optical fibers 2a, 2b, 2c, . . . are made flush by polishing an end face of the ceramic plate lamination.

According to this prior art, a plurality of optical fibers can be disposed two-dimensionally at high precision. However, position alignment of a number of holes between a plurality of ceramic plates is not easy even if a precision work is performed, and in addition it is not easy to insert optical fibers through a number of holes in the ceramic plate lamination.

SUMMARY OF THE INVENTION

An object of this invention is to provide a novel optical fiber positioning method and an optical fiber positioning plate capable of positioning optical fibers at the end face of an optical fiber holder relative to the outer periphery of the holder with ease and at high precision.

According to one aspect of the present invention, there is provided an optical fiber positioning method comprising steps of: preparing one or a plurality of optical fibers to be aligned in position, an optical fiber holder having an optical fiber holding hole corresponding to each optical fiber to be aligned in position, and a positioning plate having a fitting hole formed on one principal surface of the positioning plate and fitting therein one end face of the optical fiber holder and an optical fiber positioning hole formed through a bottom of the fitting hole corresponding to each optical fiber holding hole of the optical fiber holder, a predetermined position of each optical fiber positioning hole relative to an outer periphery of the optical fiber holder being defined as an abutting position of each optical fiber; fitting one end face of the optical fiber holder in the fitting hole and inserting each optical fiber into a corresponding optical fiber holding hole of the optical fiber holder and a corresponding optical fiber positioning hole of the optical fiber positioning plate; in a state that the end face of the optical fiber holder is fitted in the fitting hole and each optical fiber is inserted into a corresponding optical fiber holding hole of the optical fiber holder and a corresponding optical fiber positioning hole of the optical fiber positioning plate, abutting each optical fiber on the abutting position of a corresponding optical fiber positioning hole of the optical fiber positioning plate; and in a state that each optical fiber is abutted on with the abutting position of a corresponding optical fiber positioning hole of the optical fiber positioning plate, fixing each optical fiber to the optical fiber positioning plate.

According to another aspect of the present invention, there is provided an optical fiber positioning method comprising steps of: preparing one or a plurality of optical fibers to be aligned in position, an optical fiber holder having an optical fiber holding hole corresponding to each optical fiber to be aligned in position, and a positioning plate having an abutting hole formed on one principal surface of the positioning plate and having a predetermined abutting position being abutted by an outer circumference near one end face of the optical fiber holder and an optical fiber positioning hole formed through a bottom of the abutting hole and corresponding to each optical fiber holding hole of the optical fiber holder, a predetermined position of each optical fiber positioning hole relative to an outer periphery of the optical fiber holder being defined as an abutting position of each optical fiber; abutting the outer circumference near the end face of the optical fiber holder on the predetermined abutting position of the abutting hole and inserting each optical fiber into a corresponding optical fiber holding hole of the optical fiber holder and a corresponding optical fiber positioning hole of the optical fiber positioning plate; in a state that the outer circumference near the end face of the optical fiber holder is abutted on the predetermined abutting position of the abutting hole and each optical fiber is inserted into a corresponding optical fiber holding hole of the optical fiber holder and a corresponding optical fiber positioning hole of the optical fiber positioning plate, abutting each optical fiber on the abutting position of a corresponding optical fiber positioning hole of the optical fiber positioning plate; and in a state that each optical fiber is abutted on the abutting position of a corresponding optical fiber positioning hole of the optical fiber positioning plate, fixing together each optical fiber, the optical fiber positioning plate and the optical fiber holder.

In the state that the end face of the optical fiber holder is fitted in the fitting hole of the positioning plate and each optical fiber is inserted into the corresponding optical fiber holding hole and optical fiber positioning hole, each fiber is abutted on the abutting position of the corresponding optical fiber positioning hole to perform position alignment of the optical fiber relative to the optical fiber holder outer periphery. In this position alignment state, each optical fiber is fixed to the positioning plate with adhesive. The positioning plate can be formed easily by thin film processes or the like. The fitting hole and positioning hole can be formed at high precision with an error of the size and position of 1 µm or smaller. Therefore, the size and position of the optical fiber holding hole of the optical fiber holder are not required to be highly precise.

The optical fiber positioning plate to be mounted on the end face of the optical fiber holder has the fitting hole in which the end face of the optical fiber holder is fitted and the optical fiber positioning hole corresponding to each optical fiber holding hole and formed through the bottom of the optical fiber positioning plate. The predetermined position of each optical fiber positioning hole relative to the optical fiber holder outer periphery is defined as the abutting position of the optical fiber. Instead of the fitting hole, an abutting hole may be formed in the positioning plate. The abutting hole has the predetermined position abutted on which is the outer circumference of the optical fiber holder near the end face.

For position alignment of each optical fiber, in the state that the outer circumference of the optical fiber holder near at the end face is abutted on the predetermined position of the abutting hole, each optical fiber is abutted on the abutting position of the optical fiber positioning hole. In this abutting state, each optical fiber, positioning plate and optical fiber holder are fixed together with adhesive or the like. Similar effects to those of the positioning plate with the fitting hole can be obtained.

According to a further aspect of the present invention, there is provided an optical fiber array comprising: one or a plurality of optical fibers to be aligned in position; an optical fiber holder having an optical fiber holding hole corresponding to each optical fiber to be aligned in position, the optical fiber holding hole being formed through the optical fiber holder from one end face to an opposing end face thereof; a first positioning plate having a first optical fiber positioning hole corresponding to each optical fiber holding hole of the optical fiber holder, the first optical fiber positioning hole being formed through the first positioning plate from one principal surface to an opposing principal surface thereof and increasing a size thereof toward the opposing principal surface, the first positioning plate being mounted on the end face of the optical fiber holder with the first optical fiber positioning hole being communicated with a corresponding optical fiber holding hole of the optical fiber holder at the opposing principal surface; a second positioning plate having a second optical fiber positioning hole corresponding to each optical fiber holding hole of the optical fiber holder, the second optical fiber positioning hole being formed through the second positioning plate from one principal surface to an opposing principal surface thereof and increasing a size thereof toward the opposing principal surface, the second positioning plate being mounted on the opposing end face of the optical fiber holder with the second optical fiber positioning hole being communicated with a corresponding optical fiber holding hole of the optical fiber holder at the principal surface; and fixing means for fixing each optical fiber to at least one of the first and second positioning plates in a state that the first and second positioning plates are mounded on the end face and opposing end face of the optical fiber holder and each optical fiber is inserted into a corresponding second optical fiber positioning hole of the second positioning plate, a corresponding optical fiber holding hole of the optical fiber holder and a corresponding first optical fiber positioning hole of the first positioning plate.

The first and second positioning plates are mounted on the end face and opposing end face of the optical fiber holder, and each fiber is inserted from a corresponding second optical fiber positioning hole into a corresponding first optical fiber positioning hole via the optical fiber holding hole. The first and second positioning plates can be formed by thin film processes or the like highly precisely and easily. The position and size of each optical fiber positioning hole and the optical fiber positioning hole pitch can be set at a submicron precision. The optical fiber holder helps maintain straightness and parallelism of optical fibers between the first and second positioning plates. Therefore, the end position of each optical fiber at the end face of the optical fiber holder can be set highly precise by the first positioning plate.

The first positioning plate is mounted on the end face of the optical fiber holder on the opposing principal surface side where the first optical fiber positioning hole has a larger size, whereas the second positioning plate is mounted on the other end face of the optical fiber holder on the principal surface side where the first optical fiber positioning hole has a smaller size. Each optical fiber is inserted into a corresponding second optical fiber positioning hole from the larger size opening end and into a corresponding first optical fiber positioning hole from the larger size opening end. An insertion work of the optical fiber is therefore easy and smooth. The number of components is three, the optical fiber holder, first and second optical fiber positioning plates, excepting the optical fibers to be aligned in position. The assembly work is therefore simple.

According to another aspect of the present invention, there is provided an optical fiber array comprising: one or a plurality of optical fibers; an optical fiber holder having an optical fiber holding hole corresponding to each optical fiber among one or a plurality of optical fibers, the optical fiber holding hole being formed through the optical fiber holder from one end face to an opposing end face thereof, the optical fiber holder having a first positioning pin inserting hole (or groove) extending from the end face to the opposing end face and a positioning plate inserting groove formed near the end face and traversing each optical fiber holding hole and the first positioning pin inserting hole (or groove); an optical fiber positioning plate inserted in the positioning plate inserting groove and having an optical fiber positioning hole and a second positioning pin inserting hole (or groove) corresponding to each optical fiber holding hole and first positioning pin inserting hole (or groove) of the optical fiber holder and formed thorough the optical fiber positioning plate from one principal surface to an opposing principal surface thereof, each optical fiber positioning hole increasing a size toward the opposing principal surface; a positioning pin inserted into the first and second positioning pin inserting holes (or grooves) in a state that the second positioning pin inserting hole (or groove) is communicated with the first positioning pin inserting hole (or groove) and the optical fiber positioning plate is inserted into the positioning plate inserting groove with the opposing principal surface of the optical fiber positioning plate being directed toward the other end face of the optical fiber holder, the positioning pin in a state that the pin is inserted into the first and second positioning pin inserting holes (or grooves) makes each optical fiber positioning hole of the optical fiber positioning plate communicate with a corresponding optical fiber holding hole of the optical fiber holder; and fixing means for fixing the positioning pin and each optical fiber to the optical fiber holder in a state that the positioning pin is inserted into the first and second positioning pin inserting holes (or grooves) and each optical fiber is inserted into a corresponding optical fiber holding hole of the optical fiber holder and a corresponding optical fiber positioning hole of the optical fiber positioning plate.

According to still another aspect of the present invention, there is provided an optical fiber array comprising: one or a plurality of optical fibers; an optical fiber holder having an optical fiber holding hole corresponding to each optical fiber among one or a plurality of optical fibers, the optical fiber holding hole being formed through the optical fiber holder from one end face to an opposing end face thereof, the optical fiber holder having a first positioning pin inserting hole (or groove) extending from the end face to the opposing end face and a plurality of positioning plate inserting grooves formed near the end face and traversing each optical fiber holding hole and the first positioning pin inserting hole (or groove); a plurality of optical fiber positioning plates inserted in the positioning plate inserting grooves and each having an optical fiber positioning hole and a second positioning pin inserting hole (or groove) corresponding to each optical fiber holding hole and first positioning pin inserting hole (or groove) of the optical fiber holder and formed thorough each optical fiber positioning plate from one principal surface to an opposing principal surface thereof, each optical fiber positioning hole increasing a size toward the opposing principal surface; a positioning pin inserted into the first positioning pin inserting hole (or groove) and the second positioning pin inserting hole (or groove) of each optical fiber positioning plate in a state that the second positioning pin inserting hole (or groove) of each optical fiber positioning plate is communicated with the first positioning pin inserting hole (or groove) and each optical fiber positioning plate is inserted into a corresponding positioning plate inserting gr6ove with the opposing principal surface of the optical fiber positioning plate being directed toward the other end face of the optical fiber holder, the positioning pin in a state that the pin is inserted into the first and second positioning pin inserting holes (or grooves) makes each optical fiber positioning hole of each optical fiber positioning plate communicate with a corresponding optical fiber holding hole of the optical fiber holder; and fixing means for fixing each positioning pin and each optical fiber to the optical fiber holder in a state that each positioning pin is inserted into the first positioning pin inserting hole (or groove) and the second positioning pin inserting hole (or groove) of each optical fiber positioning plate and each optical fiber is inserted into a corresponding optical fiber holding hole of the optical fiber holder and a corresponding optical fiber positioning hole of each optical fiber positioning plate.

In the state that the optical fiber positioning plate or plates are inserted into one or a plurality of positioning plate inserting grooves formed near the end face of the optical fiber holder, the positioning pin is inserted into the positioning pin inserting hole (or groove) of the optical fiber holder and the positioning pin inserting hole (or groove) of the optical fiber positioning plate to establish position alignment of the optical fiber holder and optical fiber positioning plate. It is therefore possible to precisely align each optical fiber positioning hole of the optical fiber positioning plate with a corresponding optical fiber holding hole of the optical fiber holder. An insertion work for an optical fiber into the optical fiber positioning hole via the optical fiber holding hole becomes easy and an optical fiber is prevented from being bent.

Since the optical fiber positioning plate is inserted into and fixed to the positioning plate, the optical fiber positioning plate is prevented from being warped or slipped. A polishing work for the end face of the optical fiber holder can be performed without paying particular attention to the optical fiber positioning plate.

DETAILED DESCRIPTION OF THE PREFERRED EMBODIMENTS

Figure 1:
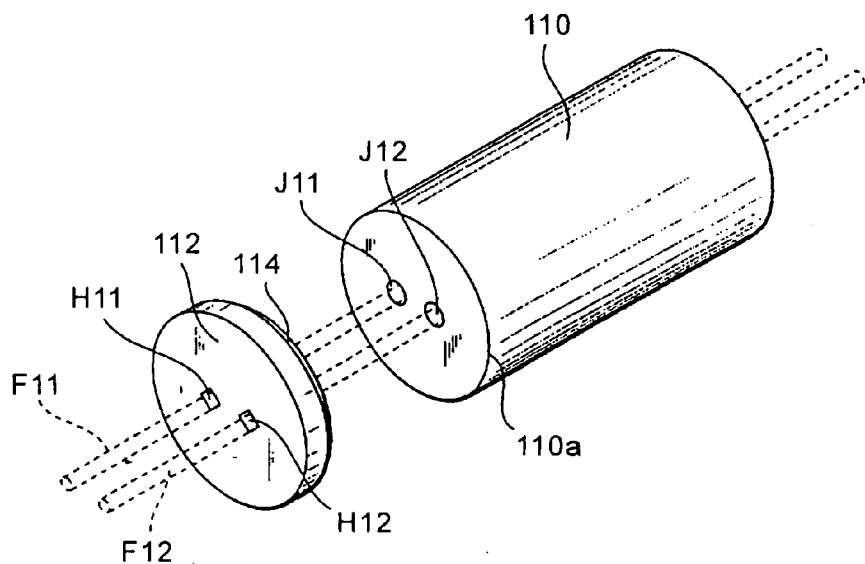
FIG. 1 is a perspective view illustrating a process of assembling an optical fiber positioning plate and an optical fiber holder according to a first embodiment of the invention.
Figure 2:
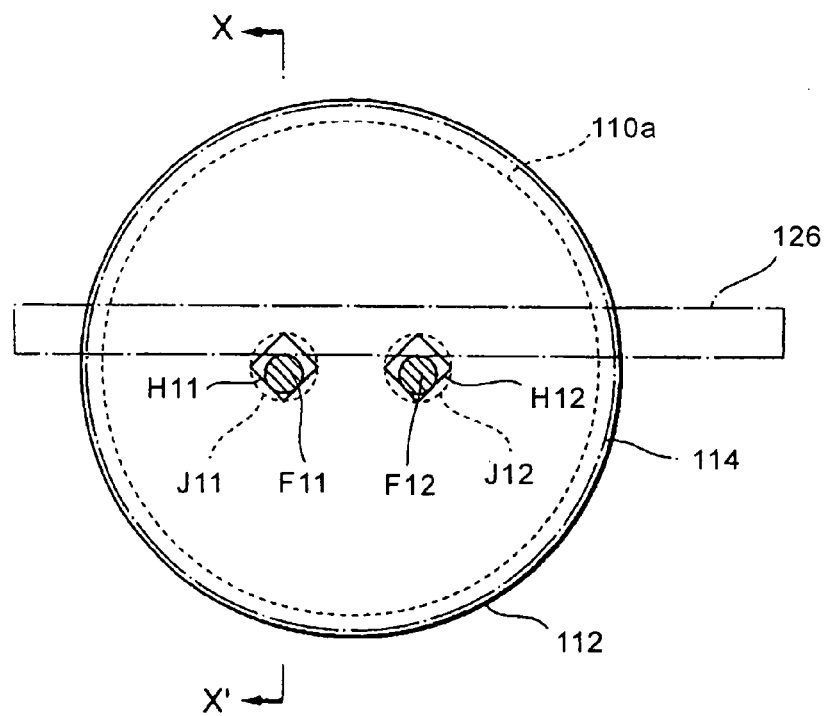
FIG. 2 is a front view illustrating an optical fiber positioning process following the process shown in FIG. 1.
Figure 3:
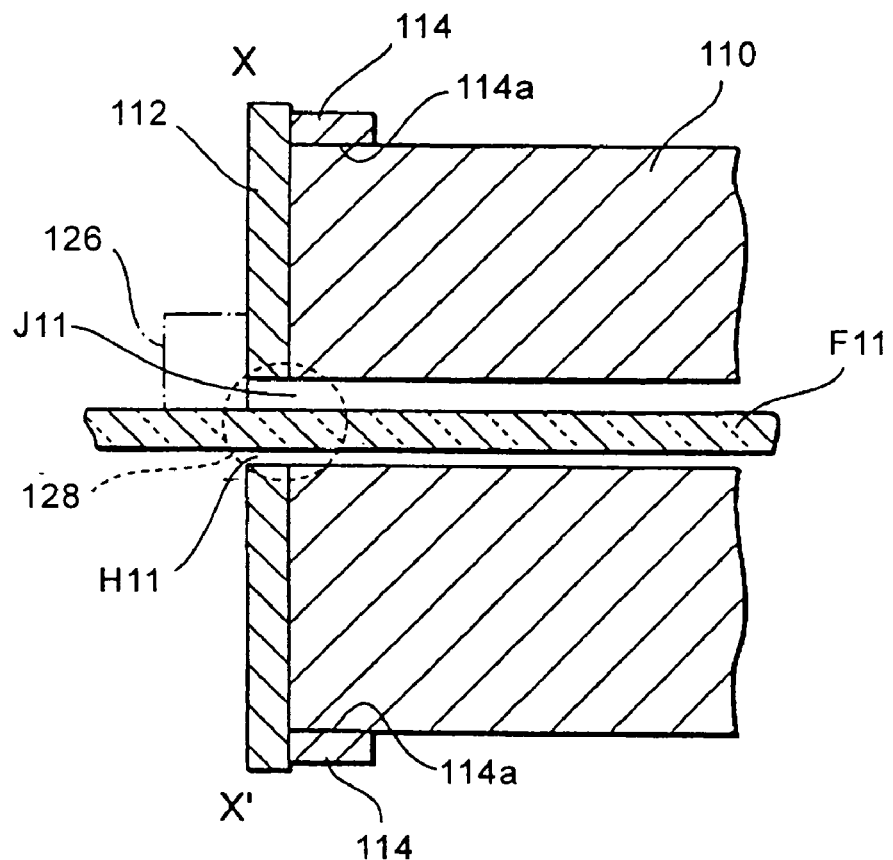
FIG. 3 is a cross sectional view taken along line X–X' shown in FIG. 2.

FIGS. 1 to 3 show an optical fiber positioning plate according to the first embodiment of the invention, and the cross sectional view taken along line X–X' in FIG. 2 is shown in FIG. 3.

The optical fiber positioning plate 112 is used by mounting it on the end face of an optical fiber holder 110 which holds optical fibers F11 and F12 with optical fiber holding holes J11 and J12. A fitting hole 114a is formed on one principal surface of the positioning plate 112 by a hole forming member 114, the end face of the holder 110 being fitted in this fitting hole 114a. In the case of the optical fiber holder 110 having a cylindrical shape, the positing plate 112 is of a disk shape and the fitting hole 114a is of a cylinder shape. Optical fiber positioning holes H11 and H12 are formed through the bottom of the fitting hole 114a at juxtaposed positions corresponding to the holding holes J11 and J12. For example, the positioning holes H11 and H12 are of a square shape, and two opposing corners of the hole H11 and two opposing corners of the hole H12 are disposed in lines along the juxtaposing direction. The size of each positioning hole H11, H12 is larger than the diameter of the optical fiber F11, F12. For example, the abutting positions of the optical fiber F11, F12 are downward corners of the positioning hole H11, H12. The downward corner as the abutting position is set by using the outer periphery 110a of the optical holder 110 as a reference position.

The positioning plate 112 is made of, for example, Ni—Fe alloy and can be manufactured by thin film processes with ease and at high precision as will be later described with reference to FIGS. 4 to 9. It is possible to form the fitting hole 114a and positioning holes H11 and H12 at high precision to the extent that errors of the size and position are 1 μm or smaller, and to set the pitch between the positioning holes H11 and H12 also at similar high precision.

The optical fiber holder 110 is made of ceramics or glass, for example, zirconia. The optical fiber holding holes J11 and J12 are formed through the optical fiber holder 110 from one end face to the opposing end face, and have a diameter larger than the optical fiber F11, F12. According to the present invention, since the positions of the optical fibers F11 and F12 are set by using the positioning plate 112, the size and position of the optical fiber holding hole J11, J12 are not required to be highly precise.

When the positions of the optical fibers F11 and F12 at the end face of the optical fiber holder 110 are to be determined relative to the outer periphery 110a of the holder 110, as shown in FIG. 3 the end face of the holder 110 is fitted in the fitting hole 114a of the positioning plate 112. As shown in FIGS. 1 to 3, the optical fiber F11 is inserted into the holding hole J11 and positioning hole H11, and the optical fiber F12 is inserted into the holding hole J12 and positioning hole H12. This insertion is performed before, after or while the end face of the optical holder 110 is fitted in the fitting hole 114a.

Next, in the state that the end face of the optical fiber holder 110 is fitted in the fitting hole 114a and that the optical fiber F11 is inserted into the holding hole J11 and positioning hole H11 and the optical fiber F12 is inserted into the holding hole J12 and positioning hole H12, as shown in FIGS. 2 and 3 the optical fibers F11 and F12 are abutted on the downward corners (abutting positions) of the positioning holes H11 and H12 by using an optical fiber pusher 126 made of a metal plate or the like. The optical fibers F11 and F12 can be aligned in position relative to the optical fiber holder outer periphery 110a.

Thereafter, in this abutting state (position alignment state), ultraviolet (UV) hardening adhesive is injected into the positioning holes H11 and H12 and holding holes J11 and J12 and hardened to fix the optical fibers F11 and F12 to the positioning plate 112 and optical fiber holder 110. Thereafter, the optical fiber pusher 126 is removed. If adhesive of a low adhesion force is used, the pusher 126 can be removed easily.

FIG. 3 shows the state that the optical fiber F11 is fixed to the positioning plate 112 and optical fiber holder 110 in an adhesion area 128. The optical fiber F12 is fixed to the positioning plate 112 and optical fiber holder 110 in a similar manner to the optical fiber F11. If the fixation of the positioning plate 112 relative to the optical fiber holder 110 fitted in the plate 112 is strong, the optical fibers F11 and F12 may be fixed only to the positioning plate 112. If the optical fiber F11 is adhered to both the positioning plate 112 and optical holder 110 in the adhesion area 128 as shown in FIG. 3, the fixation of the positioning plate 112 relative to the optical fiber holder 110 fitted in the plate 112 can be reinforced. The adhesion state shown in FIG. 3 is desired if the fixation of the positioning plate 112 relative to the optical holder 110 fitted in the plate 112 is insufficient.

Figure 12:
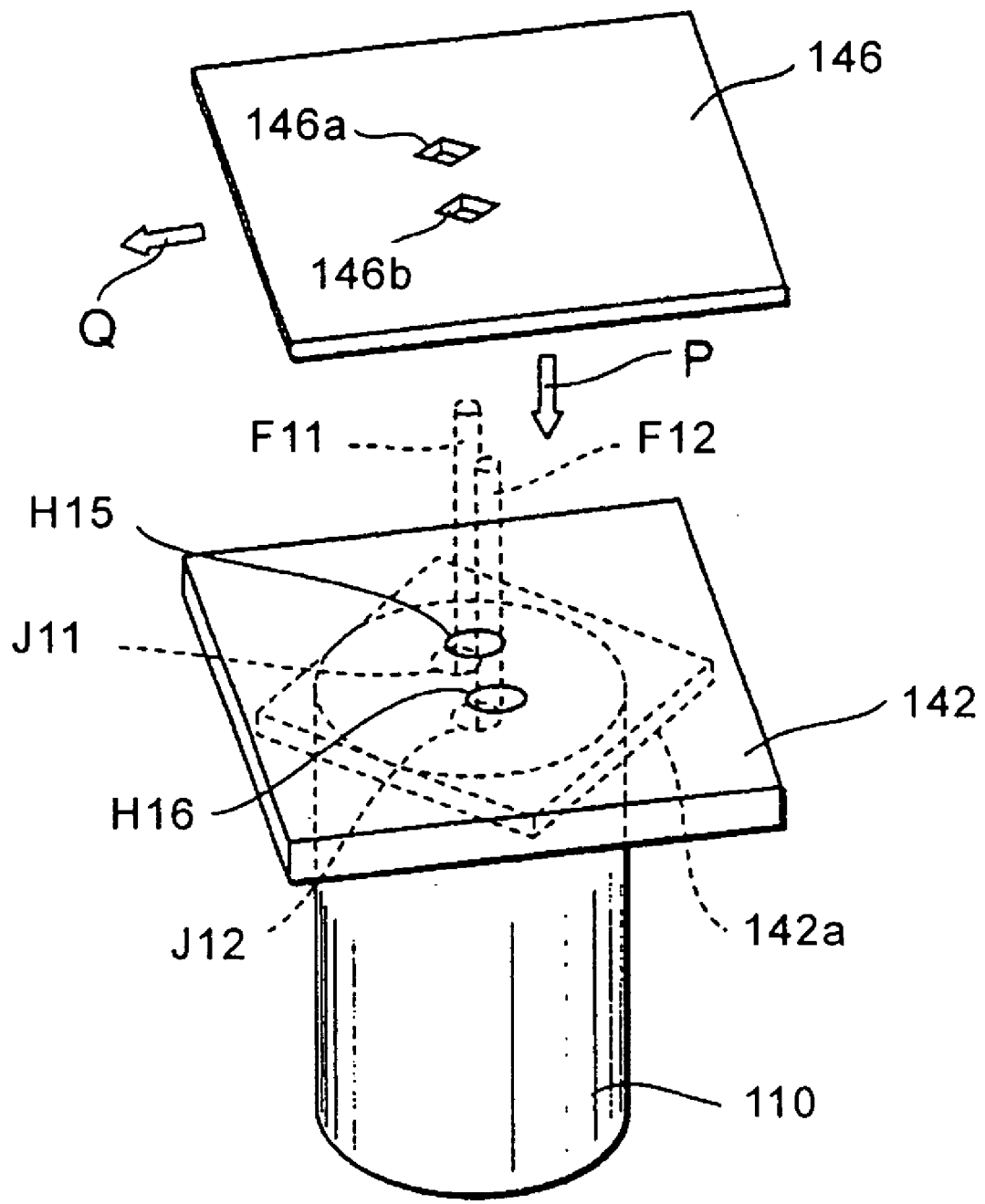
FIG. 12 is a perspective view illustrating a process of assembling an optical fiber positioning plate and an optical fiber engaging plate with an optical fiber holder according to a third embodiment of the invention.

Instead of the optical fiber pusher 126 of this embodiment, as shown in FIG. 12 an optical fiber engaging plate 146 having optical fiber engaging holes 146a and 146b may be used. When the optical fibers F11 and F12 are abutted on the downward corners of the positioning holes H11 and H12 as shown in FIG. 2, the engaging plate 146 with the ends of the optical fibers F11 and F12 being inserted through the engaging holes 146a and 146b is disposed in front of the positioning plate 112 and shifted downward to realize abutment.

The abutting position of each positioning hole H11, H12 is not limited to the downward corner so long as position alignment relative to the optical fiber holder outer periphery 110a can be achieved. For example, other corners such as upward corners, right side corners and left side corners may also be used. The shape of each positioning hole is not limited only to a square, but other shapes such as a rhomboid and an ellipse may also be used.

Next, with reference to FIGS. 4 to 9, an example of a method of manufacturing an optical fiber positioning plate will be described.

Figure 4:
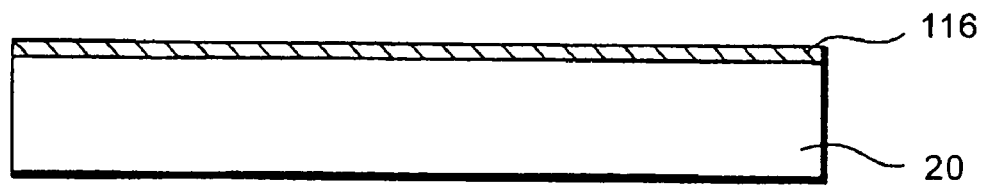
FIG. 4 is a cross sectional view illustrating a Cu layer forming process in a method of manufacturing an optical fiber positioning plate according to the invention.

In the process shown in FIG. 4, on the surface of a substrate 20 made of glass, quartz or the like, a Cu layer 116 as a plating underlayer is formed by sputtering. The thickness of the Cu layer 116 is about 1320 nm.

Figure 5:
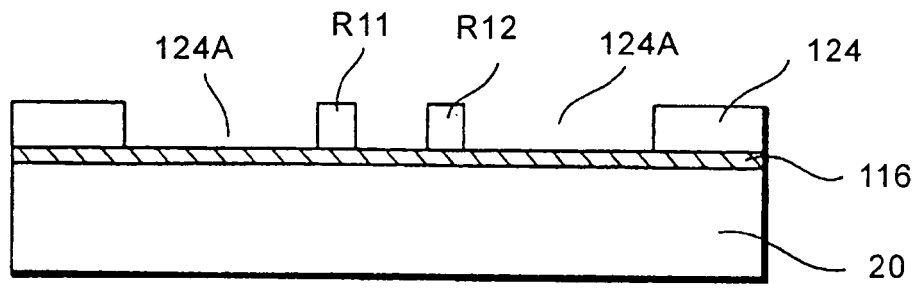
FIG. 5 is a cross sectional view illustrating a resist pattern forming process following the process shown in FIG. 4.

In the process shown in FIG. 5, resist patterns 124, R11 and R12 are formed on the Cu layer 116 by photolithography. The resist pattern 124 is used for forming the optical fiber positioning plate. The resist patterns R11 and R12 are used for forming the optical fiber positioning holes. A photomask used for forming the resist patterns 124, R11 and R12 is formed by using the optical fiber holder outer periphery 110a as the reference position.

Figure 6:
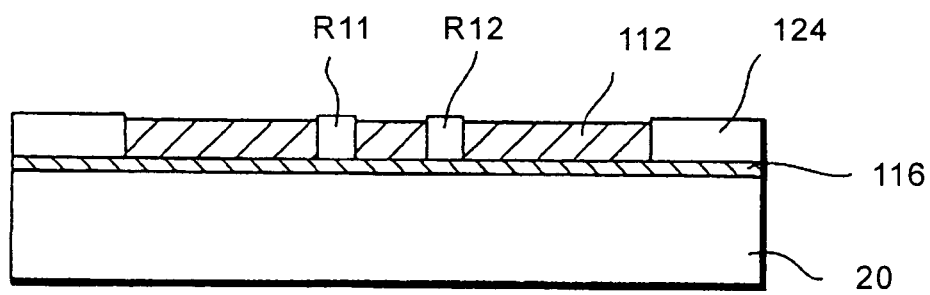
FIG. 6 is a cross sectional view illustrating a Ni—Fe alloy plating process following the process shown in FIG. 5.

In the process shown in FIG. 6, by using the resist patterns 124, R11 and R12 as a mask, a selective plating process using Ni—Fe alloy is performed to form the positioning plate 112 made of Ni—Fe alloy and having patterns corresponding to the positioning holes H11 and H12. The thickness of the positioning plate 112 is about 10 to 80 µm.

Figure 7:
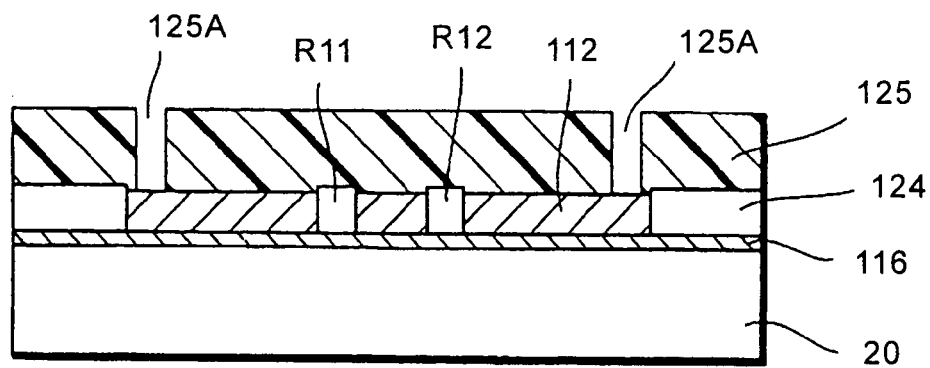
FIG. 7 is a cross sectional view illustrating a resist layer forming process following the process shown in FIG. 6.

In the process shown in FIG. 7, a resist pattern 125 is formed covering the resist patterns 124, R11 and R12 and positioning plate 112 and having a hole 125A corresponding to the fitting hole forming member. A photomask used for forming the resist pattern 125 is formed by using the optical fiber holder outer periphery 110a as the reference position.

Figure 8:
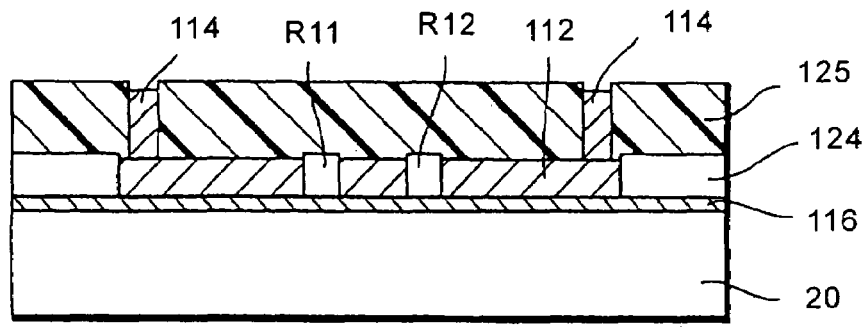
FIG. 8 is a cross sectional view illustrating a Ni—Fe alloy plating process following the process shown in FIG. 7.

In the process shown in FIG. 8, by using the resist pattern 125 as a mask, a selective plating process using Ni—Fe alloy is performed to form the hole forming member 114 made of Ni—Fe alloy and having a pattern corresponding to the hole 125A. The thickness of the hole forming member 114 is about 50 to 100 µm.

Figure 9:
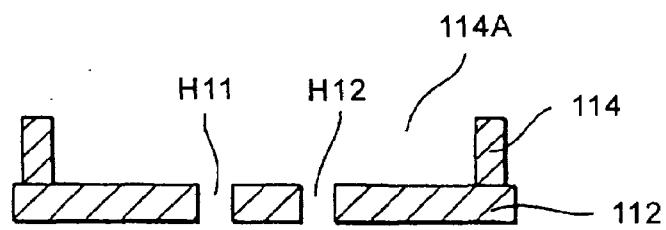
FIG. 9 is a cross sectional view illustrating a resist removing and substrate splitting process following the process shown in FIG. 8.

In the process shown in FIG. 9, after the resist patterns 124, R11, R12 and 125 are removed, the Cu layer 116 is etched and removed to split the positioning plate 112 from the substrate 20. The positioning plate 112 can therefore be formed, which has the fitting hole 114a surrounded by the hole forming member 114 on one principal surface of the plate and the optical fiber positioning holes H11 and H12 formed through the bottom of the fitting hole 114a.

Figure 10:
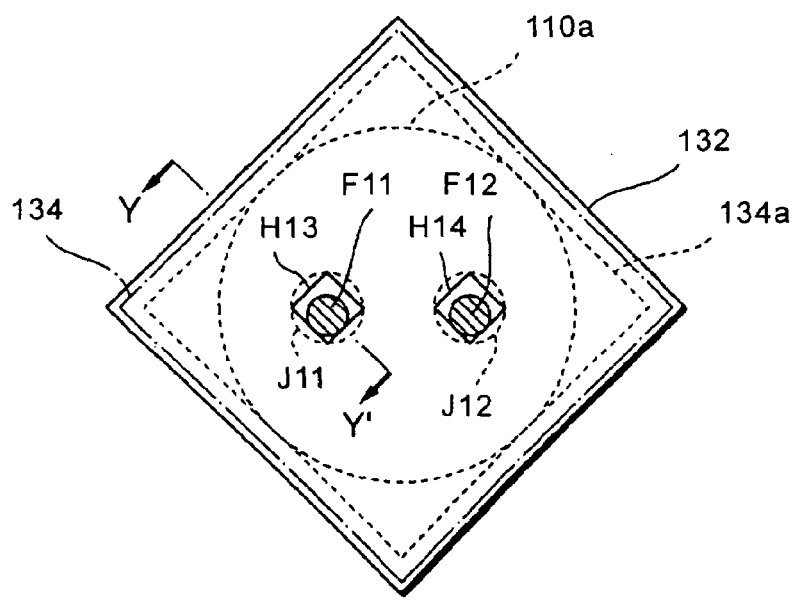
FIG. 10 is a front view showing an assembled state of an optical fiber positioning plate and an optical fiber holder according to a second embodiment of the invention.
Figure 11:
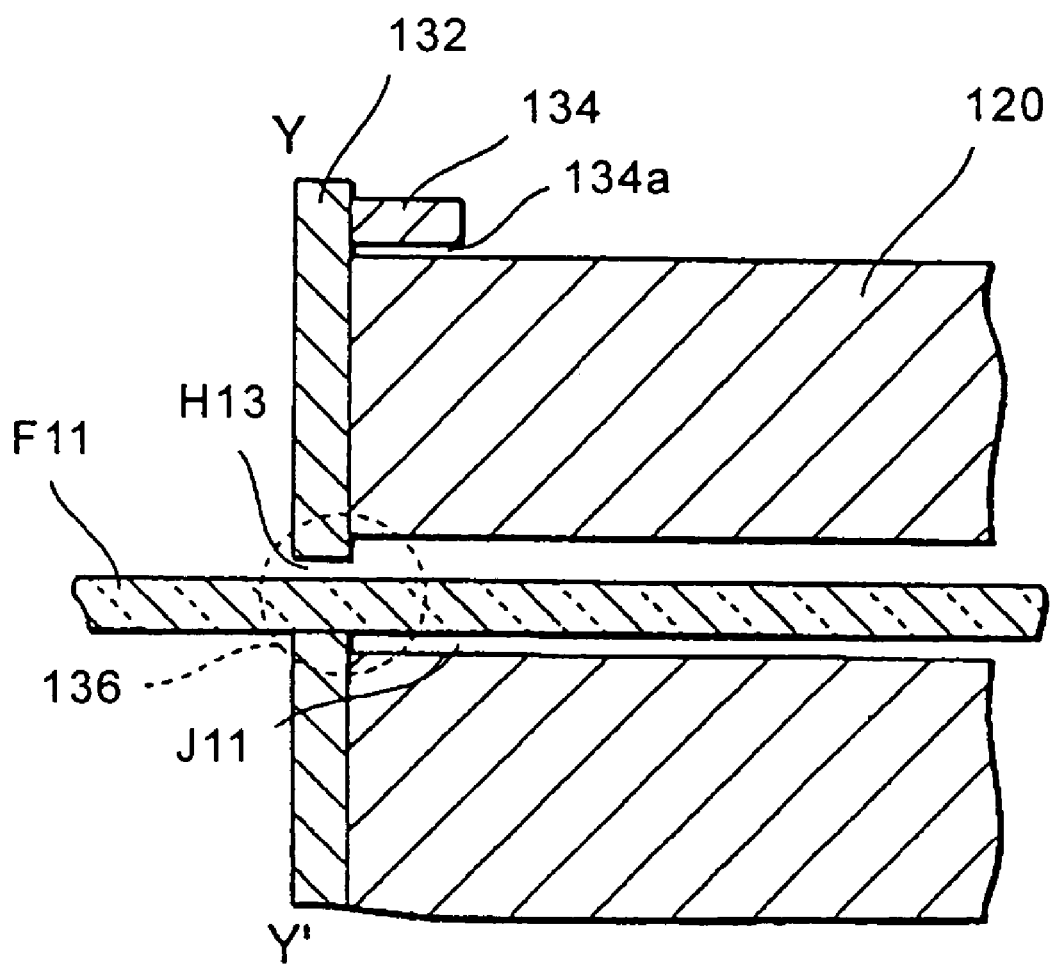
FIG. 11 is a cross sectional view taken along line Y–Y' shown in FIG. 10.

FIG. 10 shoves the state that an optical fiber positioning plate is assembled with an optical fiber holder according to the second embodiment of the invention. The cross sectional view taken along line Y–Y' in FIG. 10 is shown in FIG. 11. In FIGS. 10 and 11, like elements to those shown in FIGS. 1 to 3 are represented by using identical reference symbols, and the detailed description thereof is omitted.

The characteristics of an optical fiber positioning plate 132 of the second embodiment reside in that the positioning plate 132 and a fitting hole 134a are square as defined by a square hole forming member 134. Similar to the optical fiber positioning holes H11 and H12 of the first embodiment, positioning holes H13 and H14 are formed through the bottom of the fitting hole 134a in a juxtapose manner, the positioning holes corresponding in position to the optical fiber holding holes J11 and J12 of the optical fiber holder 110. The abutting positions of the optical fibers F11 and F12 on the positioning holes H13 and H14 are, for example, the downward corners. The downward corners as the abutting positions are formed by using the optical fiber holder outer periphery 110a as the reference position.

When the positions of the optical fibers F11 and F12 at the end face of the optical fiber holder 110 are determined relative to the optical holder outer periphery 110a, the end face of the holder 110 is fitted in the fitting hole 134a of the positioning plate 132, the optical fiber F11 is inserted into the holding hole J11 and positioning hole H13 and the optical fiber F12 is inserted into the holding hole J12 and positioning hole H14. In this fitting/insertion state, the optical fibers F11 and F12 are abutted on the downward corners (abutting positions) of the positioning holes H13 and H14 by using the optical fiber pusher 126 or optical fiber engaging plate 146. The positions of the optical fibers F11 and F12 can therefore be set relative to the optical fiber holder outer periphery 110a at high precision.

Thereafter, similar to the positioning plate 112, the optical fibers F11 and F12 in position alignment are fixed to the positioning plate 132 and optical fiber holder 110 with adhesive. FIG. 11 shows the state that the optical fiber F11 is fixed to the positioning plate 132 and optical fiber holder 110 in an adhesion area 136. The optical fiber F12 is fixed to the positioning plate 132 and optical fiber holder 110 in a similar manner to the optical fiber F11. The optical fiber pusher 126 or optical fiber engaging plate 146 is thereafter removed.

The positioning plate 132 can be formed easily and at high precision by a method similar to the method of forming the positioning plate 112 previously described with reference to FIGS. 4 to 9.

Figure 13:
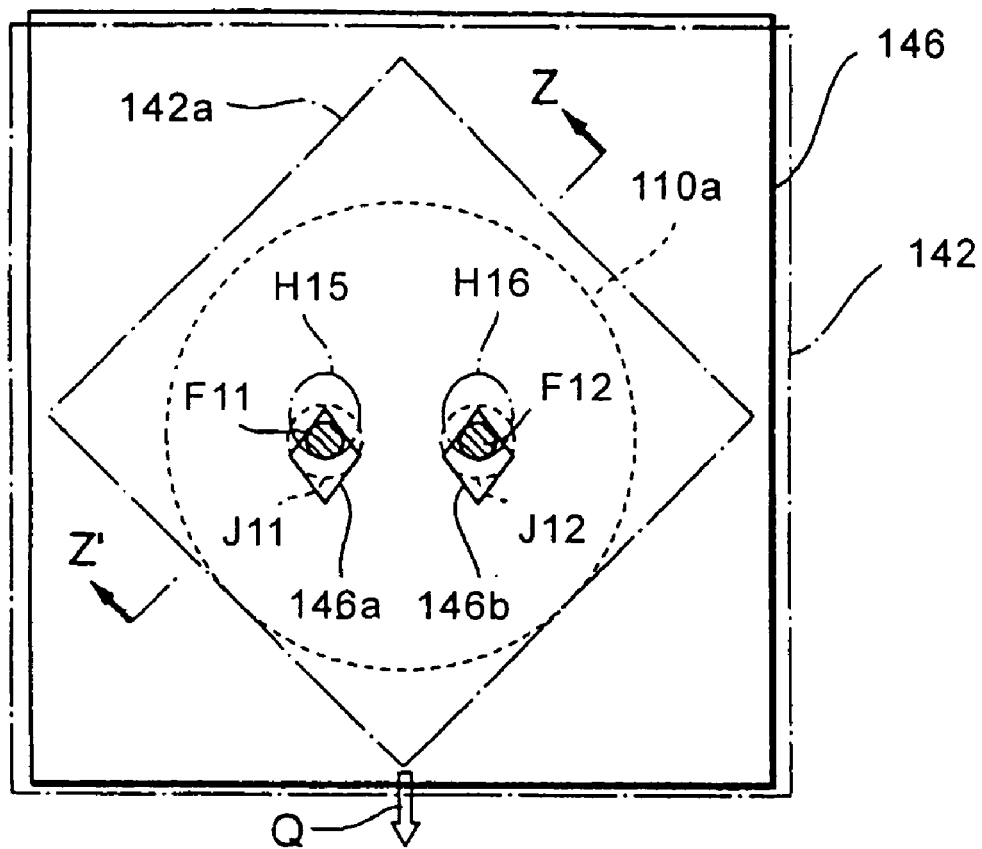
FIG. 13 is a top view illustrating an optical fiber positioning process following the process shown in FIG. 12.
Figure 14:
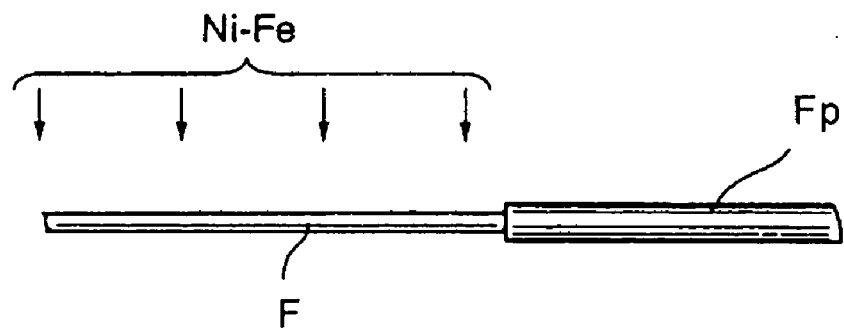
FIG. 14 is a side view illustrating a process of sputtering Ni—Fe alloy on an optical fiber.
Figure 15:
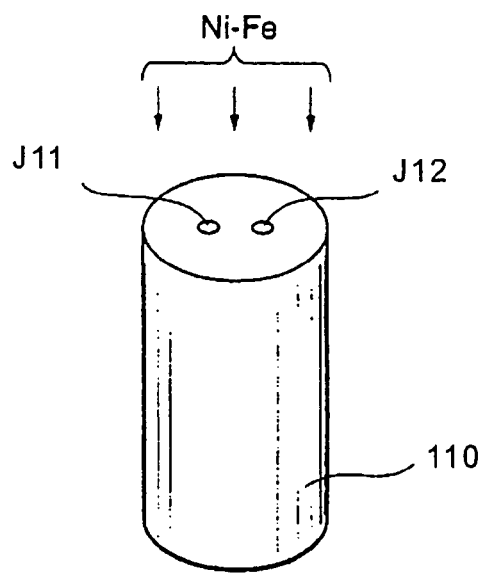
FIG. 15 is a perspective view illustrating a process of sputtering N—Fe alloy on inner surfaces of optical fiber holding holes of the optical fiber holder.
Figure 16:
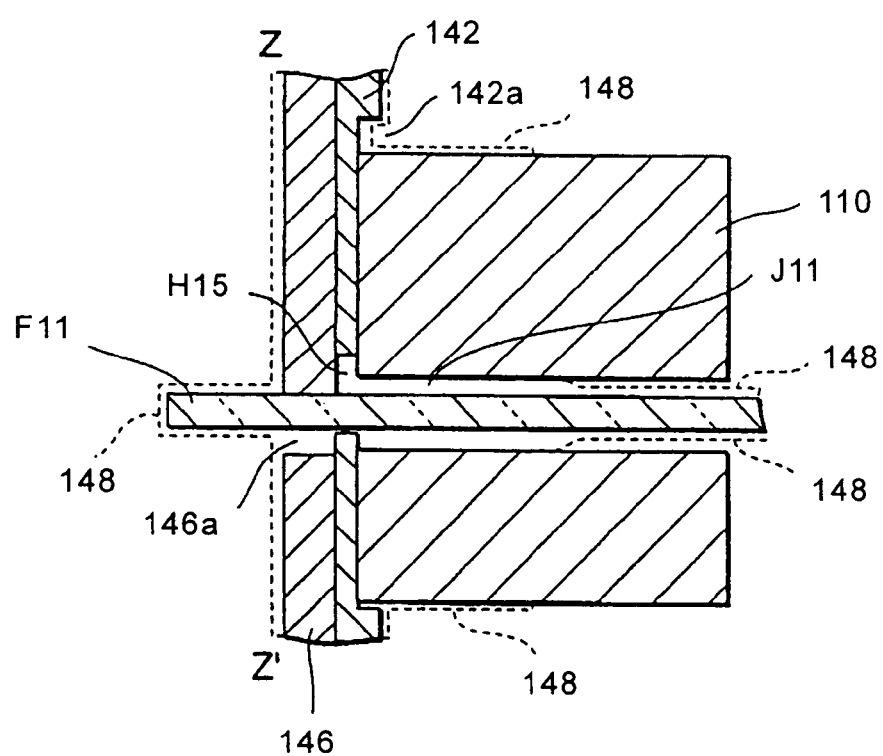
FIG. 16 is a cross sectional view taken along line Z–Z' shown in FIG. 13 and illustrating a process of fixedly assembling optical fibers, an optical fiber holder, a positioning plate and an engaging plate by Ni—Fe alloy plating.

FIGS. 12 and 13 show an optical fiber positioning plate according to the third embodiment of the invention. The cross sectional view taken along line Z–Z' in FIG. 13 is shown in FIG. 16. In FIGS. 12 to 16, like elements to those shown in FIGS. 1 to 3 are represented by using identical reference symbols, and the detailed description thereof is omitted.

The characteristics of a square optical fiber positioning plate 142 of the third embodiment reside in that a square optical fiber holder abutting hole 142a is formed on one principal surface of the positioning plate 142 and that the abutting position of the optical fiber holder 110 is the left side corner of the abutting hole 142a in FIG. 12. Optical fiber positioning holes H15 and H16 are formed through the bottom of the abutting hole 142a at juxtaposed positions corresponding to the holding holes J11 and J12 of the optical fiber holder 110. Although the positioning holes H15 and H16 are elliptic, they may be square or rhomboidal. The size of the positioning hole H15, H16 is larger than the optical fiber F11, F12. The left side as viewed in FIG. 12 of the positioning hole H15, H16 is used as the abutting position of the optical fibers F11, F12. The position of the left side as the abutting position is determined by using the optical fiber holder outer periphery 110a as the reference position.

When the positions of the optical fibers F11 and F12 at the end face of the optical fiber holder 110 are to be determined relative to the optical fiber outer periphery 110a, the following arrangement is performed. First, as shown in FIGS. 12 and 13, the outer circumference of the optical fiber holder near at its one end face is abutted on the predetermined corner of the abutting hole 142a of the positioning plate 142. Then, as shown in FIGS. 12, 13 and 16, the optical fiber F11 is inserted into the holding hole J11 and positioning hole H15 and the optical fiber F12 is inserted into the holding hole J12 and positioning hole H16. This insertion may be performed before, after or while the optical fiber holder 110 is abutted on the abutting hole 142a.

Next, in the state that the optical fiber holder 110 is abutted on the abutting hole 142a and that the optical fiber F11 is inserted into the holding hole J11 and positioning hole H15 and the optical fiber F12 is inserted into the holding hole J12 and positioning hole H16, as shown in FIGS. 12 and 13 the optical fiber engaging plate 146 is lowered in a P arrow direction to insert the optical fibers F11 and F12 into the optical fiber engaging holes 146a and 146b of the fiber engaging plate 146 and superpose the engaging plate 146 upon the positioning plate 142. In this superposition state, the engaging plate 146 is shifted right along a Q arrow direction relative to the positioning plate 142 as shown in FIGS. 12 and 13 to thereby abut the optical fibers F11 and F12 upon the left sides (abutting positions) of the positioning holes H15 and H16. The positions of the optical fibers F11 and F12 can therefore be set at high precision relative to the optical fiber holder outer periphery 110a.

Thereafter, in this abutting state (position alignment state), UV hardening adhesive is injected into the positioning holes H15 and H16 and holding holes J11 and J12 and hardened to fix the optical fibers F11 and F12 to the positioning plate 142 and optical fiber holder 110. Thereafter, the engaging plate 146 is removed. Instead of the engaging plate 146, the optical fiber pusher 126 shown in FIGS. 2 and 3 may be used for establishing abutment.

In fixing the optical fibers F11 and F12, a metal plating method may be used in place of the above-described adhesion method. In this case, as shown in FIG. 14, the sheath $F_p$ of an optical fiber F to be position-aligned is removed near its one end, and a metal layer of Ni—Fe alloy or the like as a plating underlayer is deposited by sputtering on the exposed surface of the optical fiber F. As shown in FIG. 15, a metal layer of Ni—Fe alloy or the like as a plating underlayer is deposited by sputtering also on the inner surfaces of the holding holes J11 and J12 near the end face of the optical fiber holder 110 to be abutted on the abutting hole 142a.

Next, by using the optical fibers and optical fiber holder prepared as described with FIGS. 14 and 15, abutment of the optical fiber holder and position alignment of the optical fibers are performed in a similar manner to that described with FIGS. 12 and 13. In the position alignment state shown in FIGS. 13 and 16, the assembly of the optical fibers and the like is immersed in plating liquid and a power is supplied to the engaging plate 146 to perform a metal plating process. Therefore, as shown in FIG. 16, plated layers 148 are grown on the surfaces of the engaging plate 146 and positioning plate 146 (including the inner surfaces of the holes 146a, 146b, H15 and H16), on the surfaces of the optical fiber holder 110 near at its one end (including the inner surfaces of the holes J11 and J12), and on the surfaces of the optical fibers F11 and F12. The plating process is terminated when the plated layers 148 are filled in the positioning holes H15 and H16 and holding holes J11 and J12. The optical fibers F11 and F12, optical fiber holder 110 and positioning plate 142 are therefore mutually fixed by the plated layers 148. Thereafter, the engaging plate 146 along with the plated layer attached thereto is removed.

The engaging plate 146 having the engaging holes 146a and 146b corresponding to the positioning holes H15 and H16 can be manufactured by the selective plating process and substrate splitting process described with FIGS. 4 to 6 and FIG. 9. The positioning plate 142 can be manufactured by the method described with FIGS. 4 to 9. The positioning plate 142 and engaging plate 146 may be manufactured by selective etching.

In each of the first to third embodiments described above, after the position alignment and fixation of the optical fibers F11 and F12 by using the positioning plate 123, 132 or 142, the optical fibers protruding out of the positioning plate are cut and the cut surfaces are polished to make the end faces of the optical fibers flush with the surface of the positioning plate. An optical connector can be realized by preparing first and second optical fiber holders with the positioning plates and disposing and fixing the first and second optical fiber holders so that the first and second holders contact each other and the ends of the optical fibers contact each other.

Figure 17:
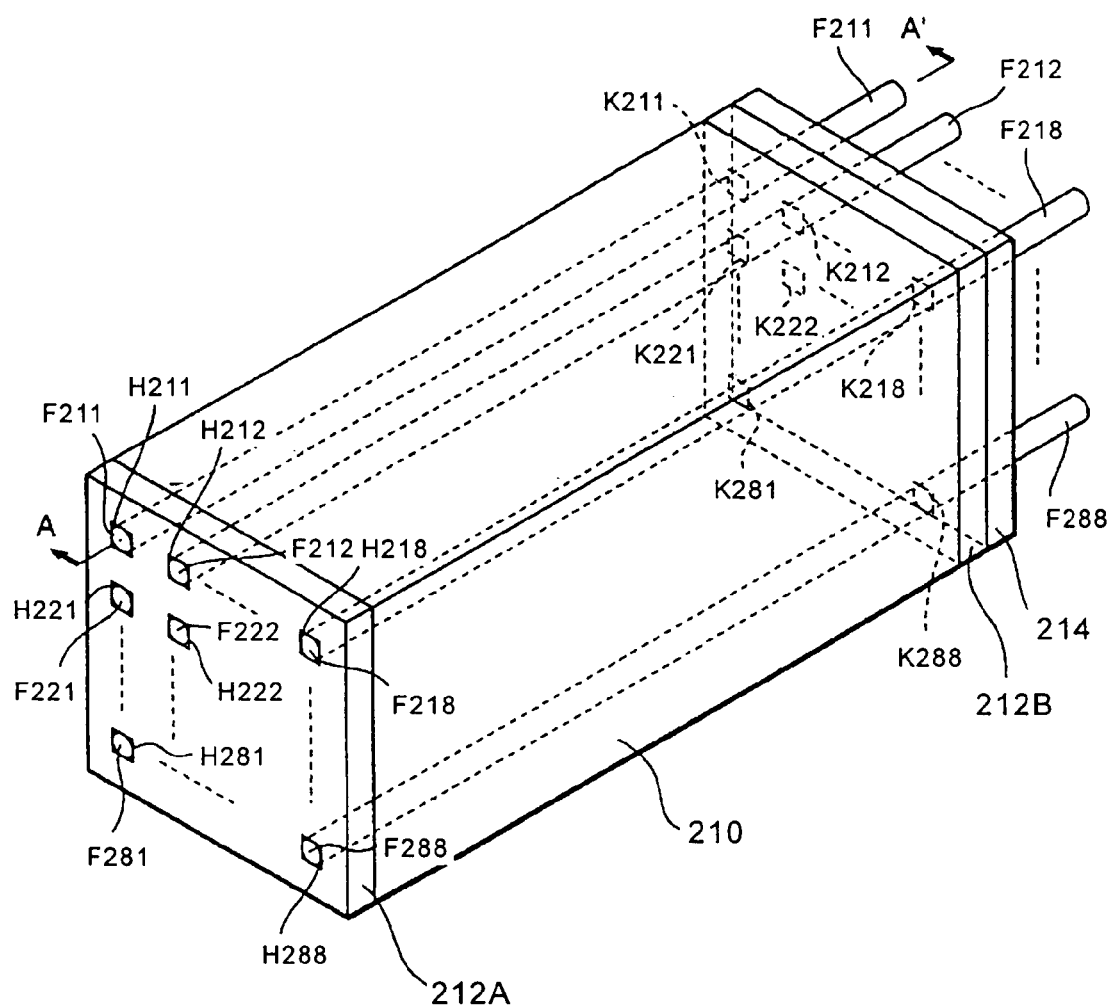
FIG. 17 is a perspective view of a two-dimensional optical fiber array according to a fourth embodiment of the invention.
Figure 18:
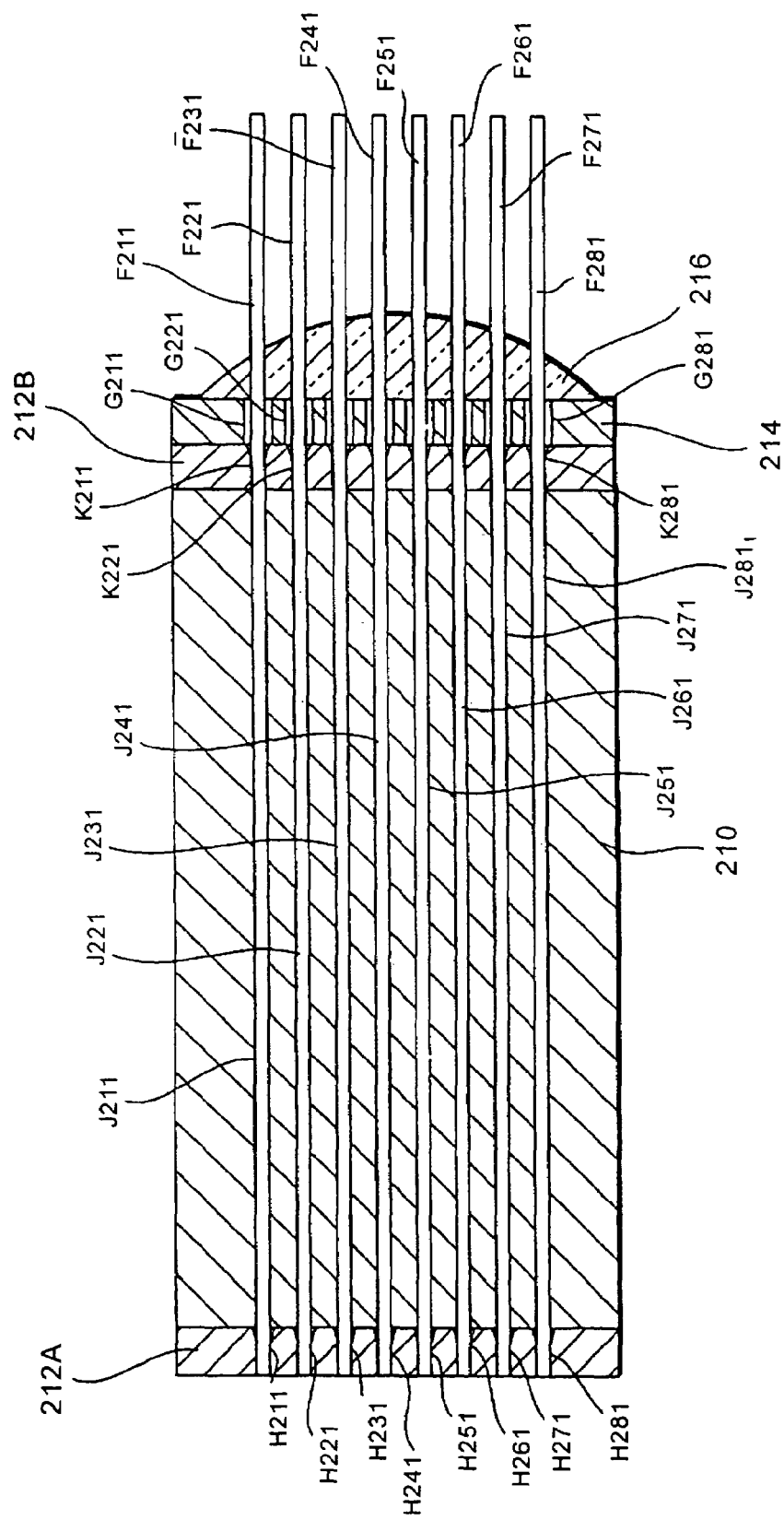
FIG. 18 is a cross sectional view taken along line A–A' shown in FIG. 17.

FIG. 17 shows a two-dimensional optical fiber array according to the fourth embodiment of the invention. The cross sectional view along line A–A' in FIG. 17 is shown in FIG. 18.

An optical fiber holder 210 is, for example, a rectangular prism and is made of metal such as stainless steel. In the optical fiber holder 210, square optical fiber holding holes J211 to J288 (in FIG. 18 only the holes J211 to J281 are shown and the others are not shown) are disposed in a matrix shape of 8×8, extending substantially in parallel through the holder 210 from its one end face to the opposing end face. In forming the optical fiber holder 210, a mechanical cutting method can be used. The holder 210 can be worked at high precision to the extent that parallelism between optical fibers is set to 10 sec or shorter (at the holder length of 12 mm and an optical fiber pitch precision of 0.5 µm). The material of the holder 210 is not limited only to metal such as stainless steel, but ceramics, glass, quartz and the like such as zirconia may also be used.

Figure 19:
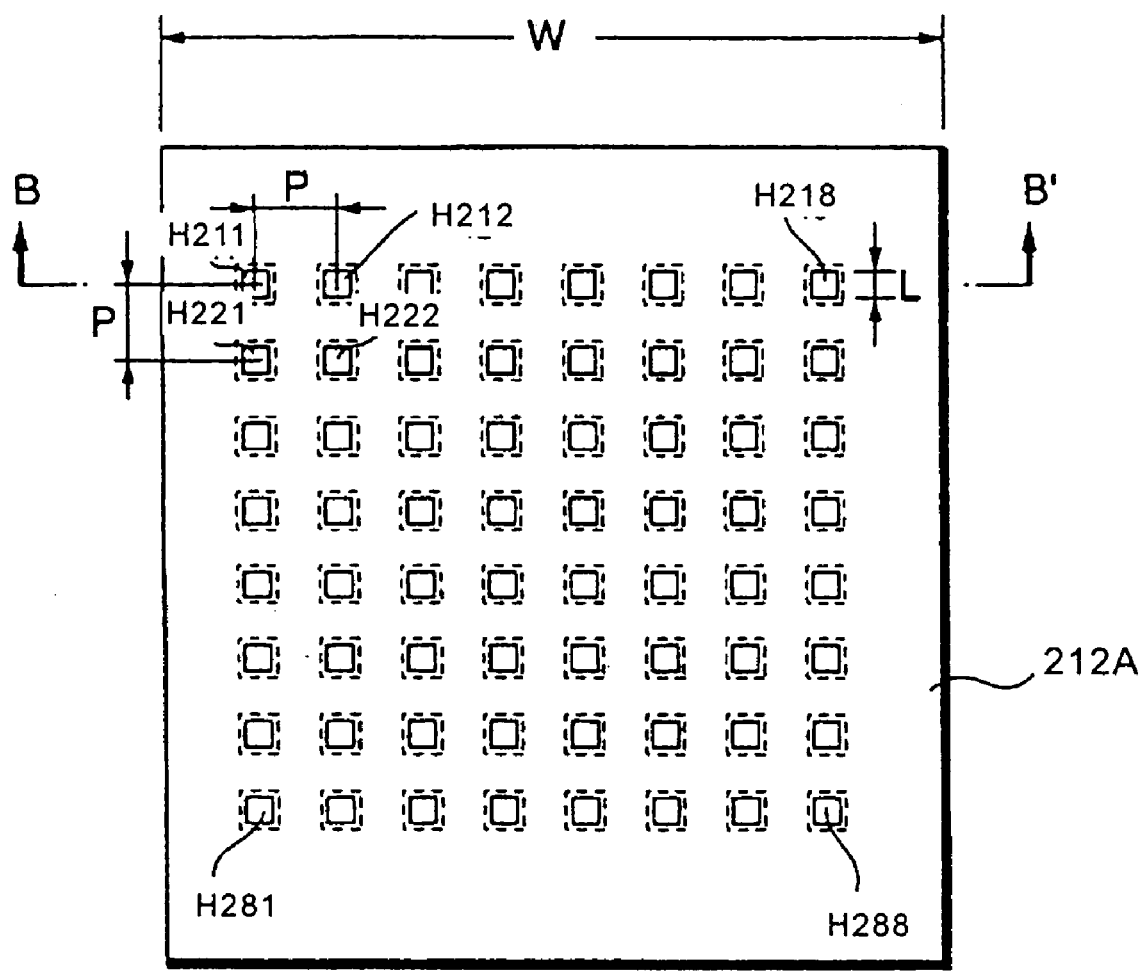
FIG. 19 is a front view of an optical fiber positioning plate.

An optical fiber positioning plate 212A is for example square as shown in FIG. 19, and is made of a metal plate such as Ni—Fe alloy. In the positioning plate 212A, square optical fiber positioning holes H211 to H288 are disposed in a matrix shape of 8×8, corresponding to the optical fiber holding holes J211 to J288 of the optical fiber holder 210 and extending through the holder positioning plate 212A from its one end face to the opposing end face.

Figure 20:
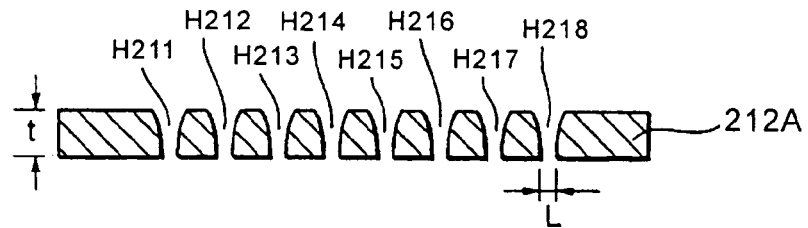
FIG. 20 is a cross sectional view taken along line B–B' shown in FIG. 19.

FIG. 20 is a cross sectional view taken along line B–B' in FIG. 19. As shown by the positioning holes H211 to H218 of FIG. 20, the size of each of the positioning holes H211 to H288 becomes larger from one end face toward the opposing end face of the positioning plate 212A. For example, the length W of each side of the positioning plate 212A is 5.8 mm, the length L of each side of the positioning hole H211, . . . is 125.5 µm, a positioning hole pitch P is 250 µm, and the thickness t of the positioning plate is 10 to 80 µm.

Similar to the structure of the positioning plate 212A, in an optical fiber positioning plate 212B, square optical fiber positioning holes K211 to K288 are disposed in a matrix shape of 8×8, corresponding to the optical fiber holding holes J211 to J288 of the optical fiber holder 210 and extending through the holder positioning plate 212B from its one end face to the opposing end face. The size of each of the positioning holes K211 to K288 becomes larger from one end face toward the opposing end face of the positioning plate 212B.

As will be later described with FIGS. 21 to 24, both the positioning plates 212A and 212B can be formed easily and at high precision by thin film processes. The position and size of each positioning hole and a positioning hole pitch can be set at a precision of submicron, e.g., 0.5 µm.

When a two-dimensional optical fiber array is to be manufactured, the optical fiber holder 210, positioning plates 212A and 212B and sixty four optical fibers (single mode fibers) having a diameter of 125 µm are prepared. The positioning plates 212A and 212B are fixed to one end face and opposing end face of the optical fiber holder 210 with adhesive. More specifically, the positioning plate 212A is fixed to one end face of the optical fiber holder 210 in such a manner that the positioning holes H211 to H288 communicate with the optical fiber holding holes J211 to J288 of the optical fiber holder 210 on the other principal surface of the positioning plate 212A (a principal surface at the larger positioning hole size). Similarly, the positioning plate 212B is fixed to the opposing end face of the optical fiber holder 210 in such a manner that the positioning holes K211 to K288 communicate with the optical fiber holding holes J211 to J288 on the principal surface of the positioning plate 212B (a principal surface at the smaller positioning hole size). As shown in FIG. 18, for example, the positioning hole H211 communicates with the holding hole J211 at the larger size opening end, whereas the positioning hole K211 communicates with the holding hole J211 at the smaller size opening end. Either one of the positioning plates 212A and 212B may be fixed first or both of them may be fixed at the same time.

Next, each optical fiber is inserted from the corresponding positioning hole of the positioning plate 212B, and via the corresponding optical fiber holding hole of the optical fiber holder 210, into the corresponding positioning hole of the positioning plate 212A. For example, as shown in FIG. 18, the optical fiber F211 is inserted from the positioning hole K211 and via the holding hole J211 into the positioning hole H211. Since the optical fiber F211 is inserted from the large size opening ends of the positioning holes K211 and H211, the optical fiber F211 can be easily and smoothly inserted. An insertion work similar to that for the optical fiber F211 is performed for each of the other optical fibers F212 to F288.

Thereafter, the optical fibers F211 to F288 are fixed to the positioning plate 212B by using an adhesion layer 216. The ends of the optical fibers protruded out of the positioning plate 212A are polished to make the ends of the optical fibers flush with the surface of the positioning plate 212A.

In the fourth embodiments, the position of the end of each optical fiber can be set at high precision by the positioning plate 212A at one end of the optical fiber holder 210 under the condition that the straightness or parallelism of the optical fibers F211 to F288 is maintained highly precise in the optical fiber holder 210 and positioning plates 212A and 212B. The insertion work is simple and smooth because each optical fiber is inserted from the large size opening ends of the positioning holes of both the positioning plates 212A and 212B.

In the fourth embodiment, an optical fiber guide plate 214 shown in FIGS. 17 and 18 may be mounted on the other principal surface of the positioning plate 212B (a principal surface at the larger positioning hole size). This guide plate 214 is for example square and is made of a metal plate such as stainless steel. In the guide plate 214, square optical fiber guiding holes G211 to G288 (in FIG. 18 only the holes G211 to G281 are shown and the others are not shown) are disposed in a matrix shape of 8×8, corresponding to the positioning holes K211 to K288 of the positioning plate 212B and extending through the guide plate 214 from its one end face to the opposing end face. Each guiding hole of the guiding plate 214 is formed to have a size larger than the opposing positioning hole of the positioning plate 212B so as to make it easy to insert the optical fiber.

After, before or while the positioning plate 212B is mounted on the opposing end face of the optical fiber holder 210, the guide plate 214 is mounted on the positioning plate 212B in such a manner that each positioning hole of the positioning plate 212B communicates with the corresponding guiding hole of the guide plate 214. Each optical fiber is inserted from the corresponding guiding hole of the guiding plate 214 into the corresponding positioning hole of the positioning plate 212B. As shown in FIG. 18, for example, the optical fiber F211 is inserted from the guiding hole G211 having the size larger than the positioning hole K211, and via the larger size opening end of the positioning hole K211 into the positioning hole K211. It is therefore possible to insert the optical fiber F211 easily and smoothly. An insertion work similar to that for the optical fiber F211 is performed for each of the other optical fibers F212 to F288. The optical fiber insertion work for the optical fiber holder 210 and positioning plate 212A is similar to that described earlier. After the insertion work of the optical fibers F211 to F288 is completed, the optical fibers F211 to F288 are fixed to the guide plate 214 by the adhesion layer 216.

Next, with reference to FIGS. 21 to 24, an example of a method of manufacturing the optical fiber positioning plate such as the positioning plates 212A and 212B will be described.

Figure 21:
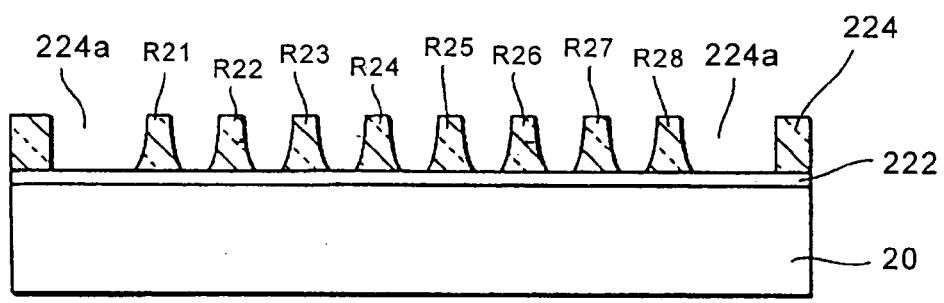
FIG. 21 is a cross sectional view illustrating a resist layer forming process in an example of a method of manufacturing an optical fiber positioning plate according to the invention.

In the process shown in FIG. 21, on one principal surface of a substrate 20 made of, for example, glass or quartz, a Cu/Cr lamination layer (a lamination layer with a Cu layer stacked upon a Cr layer) 222 as a plating underlayer is formed by sputtering. The Cr layer is used for improving tight contactness of the Cu layer relative to the substrate 20. Thicknesses of the Cr and Cu layer are about 30 nm and 300 nm, respectively.

Next, resist patterns 224, R21 to R28 are formed on the Cu/Cr lamination layer 222. The resist pattern 224 has a hole 224a corresponding to the plan pattern of the optical fiber positioning plate. The resist patterns R21 to R28 have patterns corresponding to optical fiber positioning holes to be formed in the hole 224a. Each of the resist patterns R21 to R28 has a shape increasing its size downward. In order to form the normal taper resist shape such as the resist patterns R21 to R28, one of the following methods is adopted by using a stepper (a reduction projection aligner):

(1) a method of setting the focal point in the resist layer;

(2) a method of setting an exposure amount smaller at the lower region of the resist layer; and (3) a method of gradually changing a transmission factor of an exposure mask (increasing the transmission factor higher at a lower position in the skirt of the resist pattern).

Figure 22:
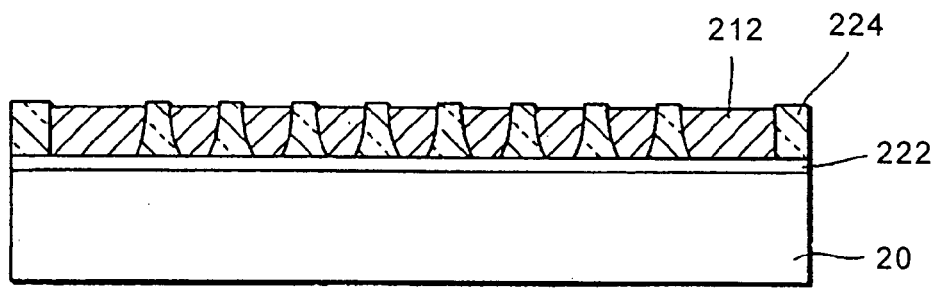
FIG. 22 is a cross sectional view illustrating a selective plating process following the process shown in FIG. 21.

In the process shown in FIG. 22, by using the resist patterns 224, R21 to R28 as a mask, a selective plating process of Ni—Fe alloy is performed to form an optical fiber positioning plate 212 made of a Ni—Fe alloy layer. The thickness of the positioning plate 212 is set to about 10 to 80 μm.

Figure 23:
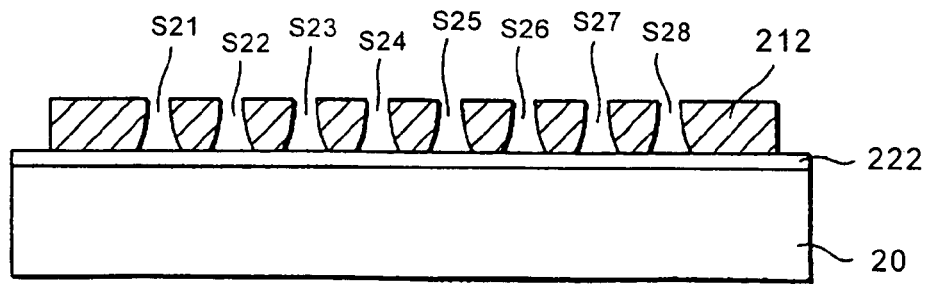
FIG. 23 is a cross sectional view illustrating a resist layer removing process following the process shown in FIG. 22.

In the process shown in FIG. 23, the resist patterns 224, R21 to R28 are removed by a chemical process or the like. As the resist patterns R21 to R28 are removed, optical fiber positioning holes S21 to S28 are formed in the positioning plate 212. Since the resist pattern increases its size downward, each positioning hole in the positioning plate 212 reduces its size downward.

Figure 24:
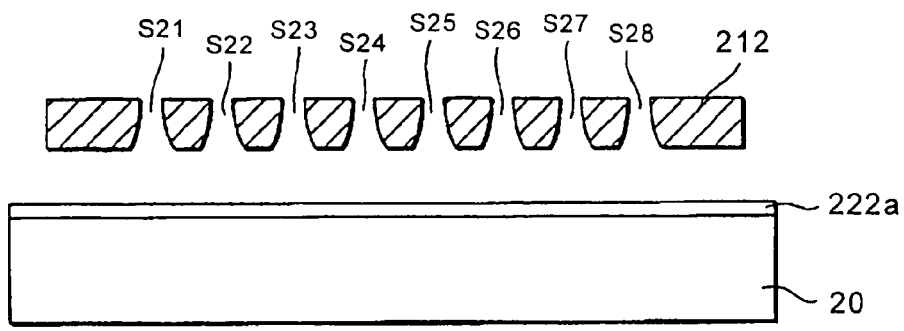
FIG. 24 is a cross sectional view illustrating a substrate splitting process following the process shown in FIG. 23.

In the process shown in FIG. 24, the Cu layer of the Cu/Cr lamination layer 222 is removed by etching to split the positioning plate 212 from the substrate 20. The Cr layer 222a is left on the upper surface of the substrate 20. The substrate can be used repetitively by sputtering a CU layer on the Cr layer 222a.

FIGS. 25 to 29 illustrate another example of the method of manufacturing the optical fiber positioning plate. In FIGS. 25 to 29, like elements to those shown in FIGS. 21 to 24 are represented by identical reference symbols and the description thereof is omitted.

Figure 25:
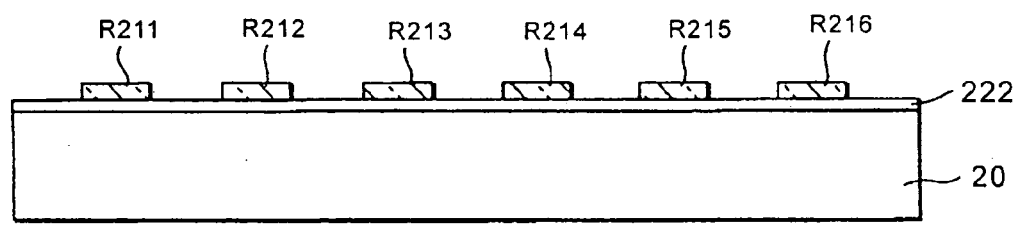
FIG. 25 is a cross sectional view illustrating a resist layer forming process in another example of the method of manufacturing an optical fiber positioning plate according to the invention.

In the process shown in FIG. 25, on one principal surface of a substrate 20 made of, for example, glass or quartz, a Cu/Cr lamination layer (a lamination layer with a Cu layer stacked upon a Cr layer) 222 as a plating underlayer is formed by sputtering. The Cr layer is used for improving tight contactness of the Cu layer relative to the substrate 20. Thicknesses of the Cr and Cu layer are about 30 nm and 300 nm, respectively. After the Cu/Cr lamination layer 222 is formed, resist patterns (negative resist patterns) R211 to R216 corresponding to desired adhesion hole patterns are formed on the Cu/Cr lamination layer 222 by photolithography.

Figure 26:
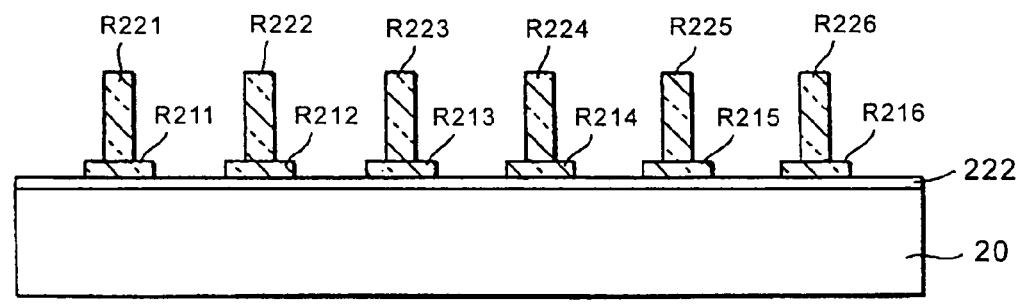
FIG. 26 is a cross sectional view illustrating a resist layer forming process following the process shown in FIG. 25.

Next, in the process shown in FIG. 26, resist patterns (negative resist patterns) R221 to R226 corresponding to desired positioning holes are formed on the resist patterns R211 to R216 by photolithography.

Figure 27:
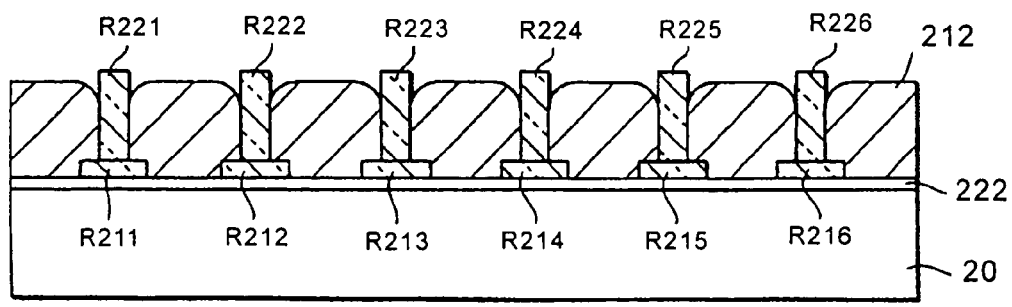
FIG. 27 is a cross sectional view illustrating a selective plating process following the process shown in FIG. 26.

In the process shown in FIG. 27, by using the resist patterns R211 to R216 and R221 to R226 as a mask, a selective plating process using Ni—Fe alloy is performed to form an optical fiber positioning plate 212 made of a Ni—Fe alloy layer. In this case, the positioning plate 212 is formed in such a manner that the Ni—Fe alloy layer is formed spaced apart from each resist pattern at the upper circumferential area of the pattern (i.e., the positioning hole increases its size upward).

Figure 30:
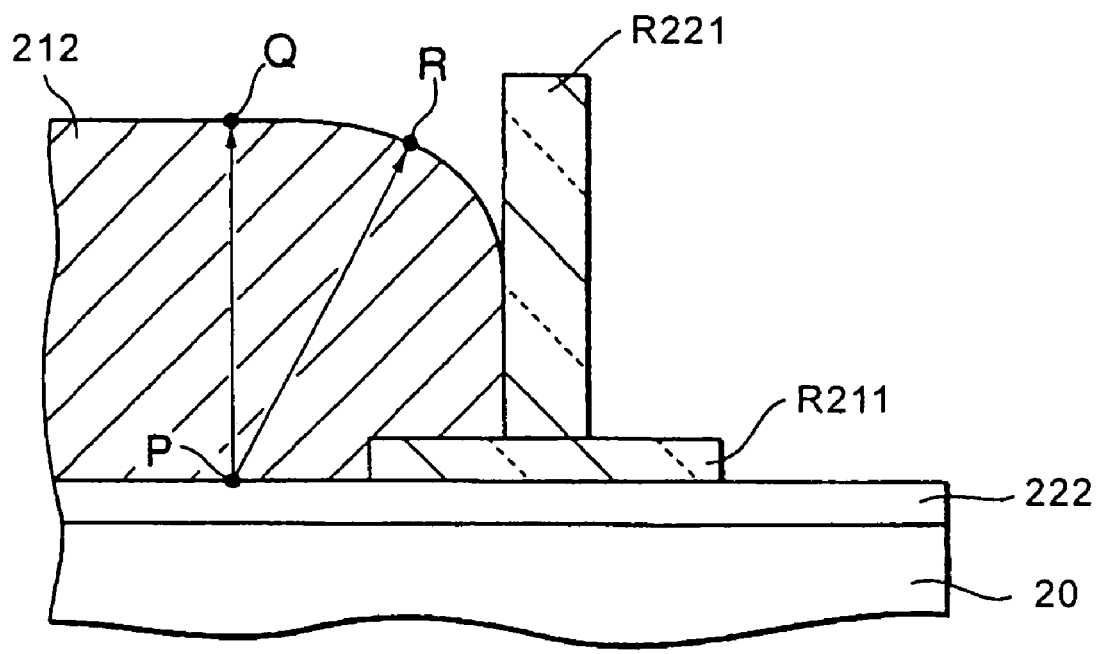
FIG. 30 is a cross sectional view showing the growth state of a plated layer by the selective plating process.

FIG. 30 illustratively shows the growth state of the plated layer 212 relative to the resist patterns R211 and R221. Points Q and R on the surface of the plated layer 212 are an equidistance as viewed from a point P on the Cu/Cr lamination layer 222 near the resist pattern R211. Since the plated layer 212 was grown isotropically, the plated layer 212 grows from the point P overriding the resist pattern R211 under the point R where the resist pattern R211 exists and the plating underlayer is not exposed. Therefore, the plated layer (positioning plate) 212 is formed spaced apart from each resist pattern at the upper circumferential area of the pattern.

Figure 28:
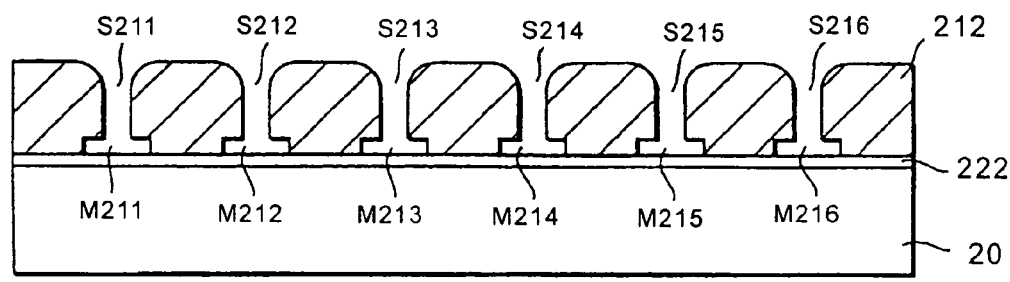
FIG. 28 is a cross sectional view illustrating a resist layer removing process following the process shown in FIG. 27.

In the process shown in FIG. 28, the resist patterns R211 to R216 and R221 to R226 are removed by a chemical process or the like so that the positioning plate 212 has positioning holes H211 to H216 and adhesion holes M11 to M16. In the positioning plate 212, therefore, each of the positioning holes H211 to H216 extends through the positioning plate 212 from one principal surface to opposing principal surface and increases its size toward the opposing principal surface. Each of the adhesion holes M211 to M216 is formed continuously with a corresponding one of the positioning holes H211 to H216 at its smaller size end, and has the size larger than the smaller size end.

Figure 29:
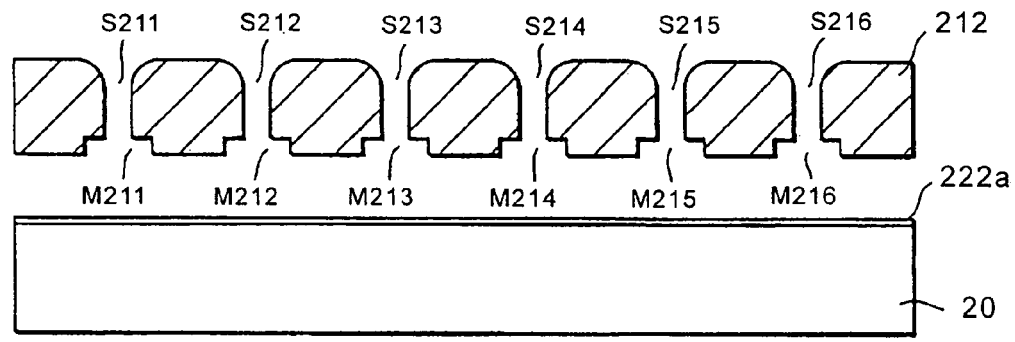
FIG. 29 is a cross sectional view illustrating a substrate splitting process following the process shown in FIG. 28.

In the process shown in FIG. 29, the Cu layer of the Cu/Cr lamination layer 222 is etched and removed to split the positioning plate 212 from the substrate 20.

Figure 31:
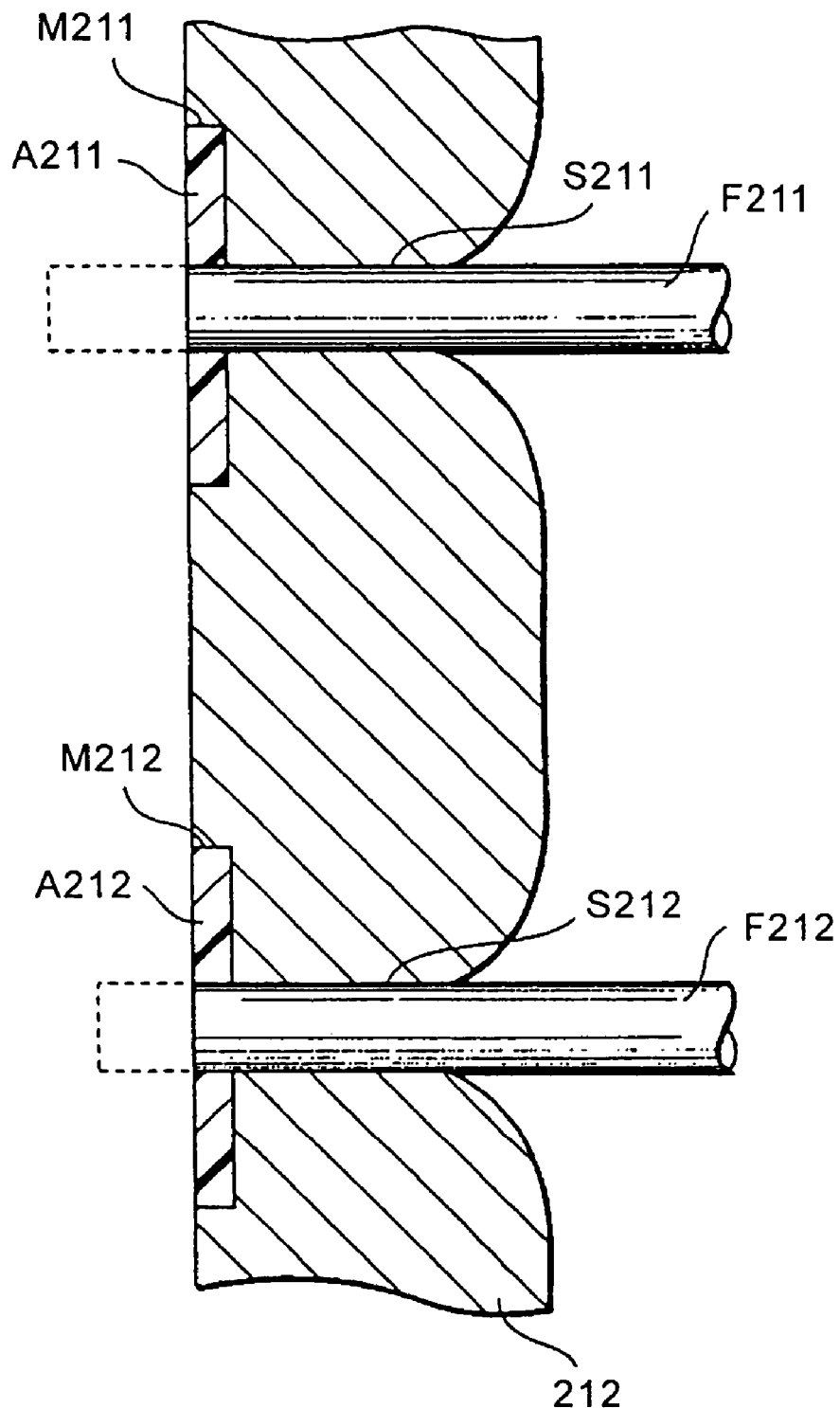
FIG. 31 is a cross sectional view illustrating the fixed state of optical fiber ends after the positions of optical fibers are determined by the positioning plate manufactured by the method shown in FIGS. 25 to 29.

FIG. 31 shows the fixation state of the ends of optical fibers when the positions of the optical fibers are determined by mounting the positioning plate 212 manufactured by the method illustrated in FIGS. 25 to 29 on one end face of the optical fiber holder 210 shown in FIGS. 17 and 18.

Optical fibers F211 and F212 are inserted into the positioning holes S211 and S12 from the opposing principal surface of the positioning plate 212 (a principal surface at the larger size positioning hole end), and protruded via the adhesion holes M211 and M212 out of the principal surface of the positioning plate 212. In this state, adhesive is coated on the outer peripheries of the optical fibers F211 and F212 in the adhesion holes M211 and M212 and hardened to fix the optical fibers F211 and F212 to the positioning plate 212 with adhesion layers A211 and A212. Thereafter, a polishing process is performed relative to the principal surface of the positioning plate 212 to remove the projected portions (indicated by broken lines) of the optical fibers F211 and F212 and the projected portions (not shown) of the adhesion layers A211 and A212 to thereby planarize the principal surface of the positioning plate 212.

When the optical fiber fixation structure shown in FIG. 31 is adopted, the optical fiber fixation structure with the adhesion layer 216 shown in FIGS. 17 and 18 may be omitted or it may be used in combination.

According to the above-described optical fiber positioning plate manufacture method, the position and size of each of the optical fiber positioning holes S21 to S28 or S211 to S216 and the optical fiber positioning hole pitch can be set at a submicron precision such as 0.5 μm. Although the positioning plate 212 having the positioning holes S21 to S28 or S211 to S216 disposed one-dimensionally has been described by way of example, the positioning plate having positioning holes disposed two-dimensionally can also be formed by the method similar to that described above. The positioning plate may be formed by selective etching capable of taper etching.

Figure 32:
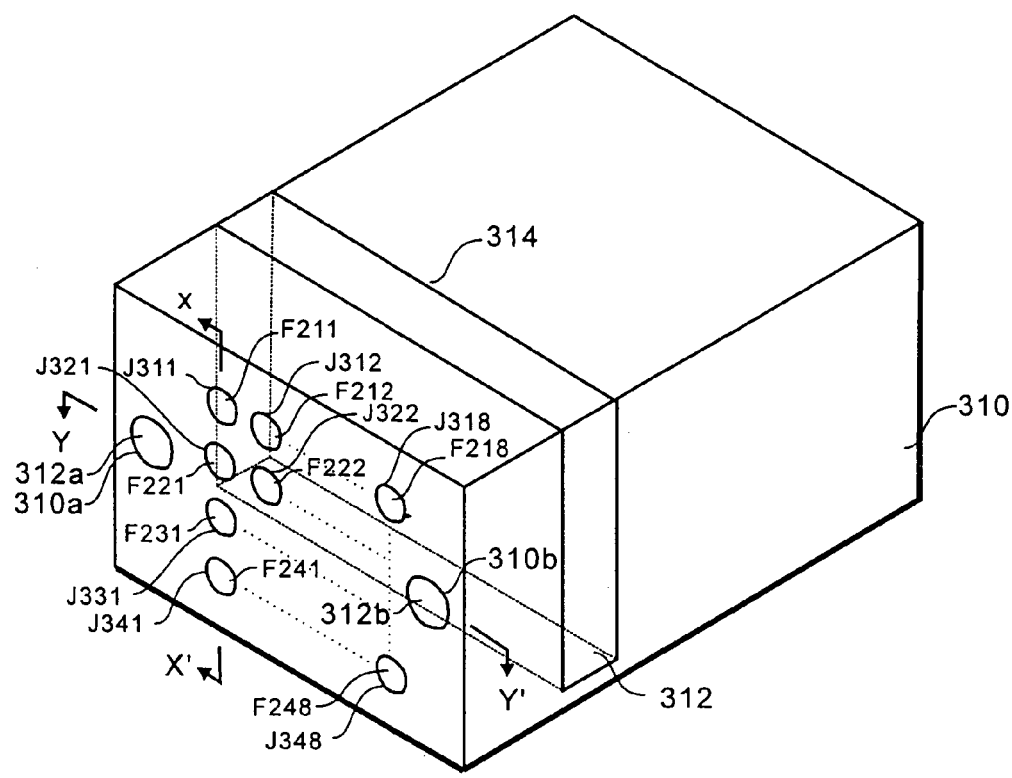
FIG. 32 is a perspective view of an optical fiber array according to a fifth embodiment of the invention.
Figure 33:
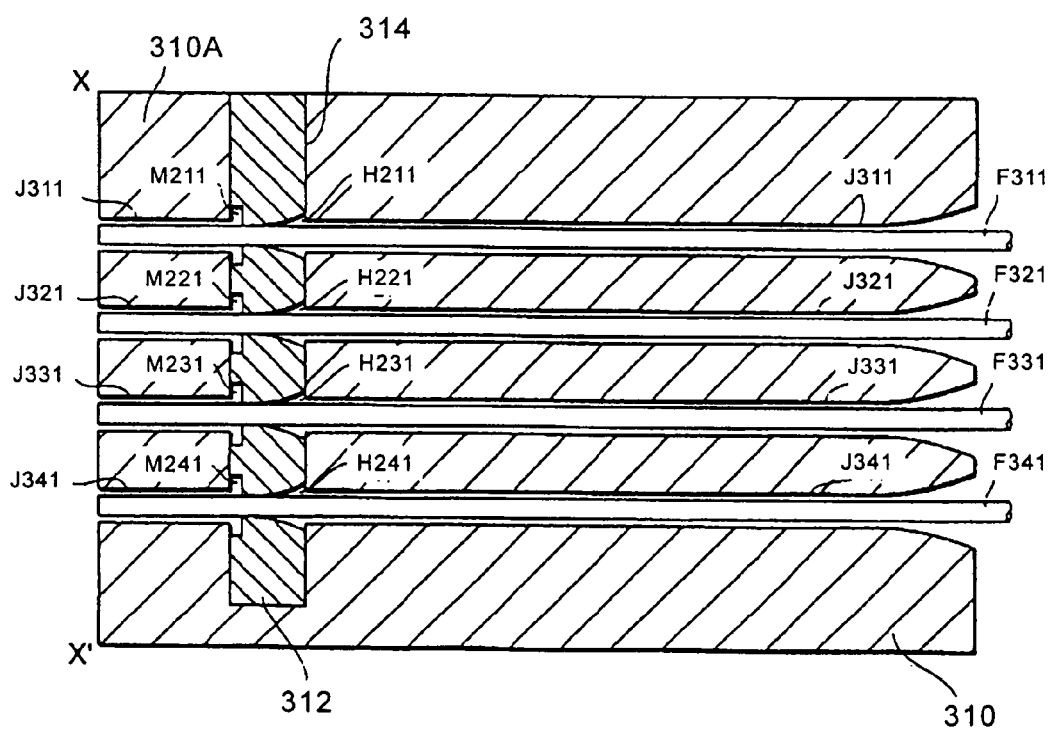
FIG. 33 is a cross sectional view taken along line X–X' shown in FIG. 32.
Figure 34:
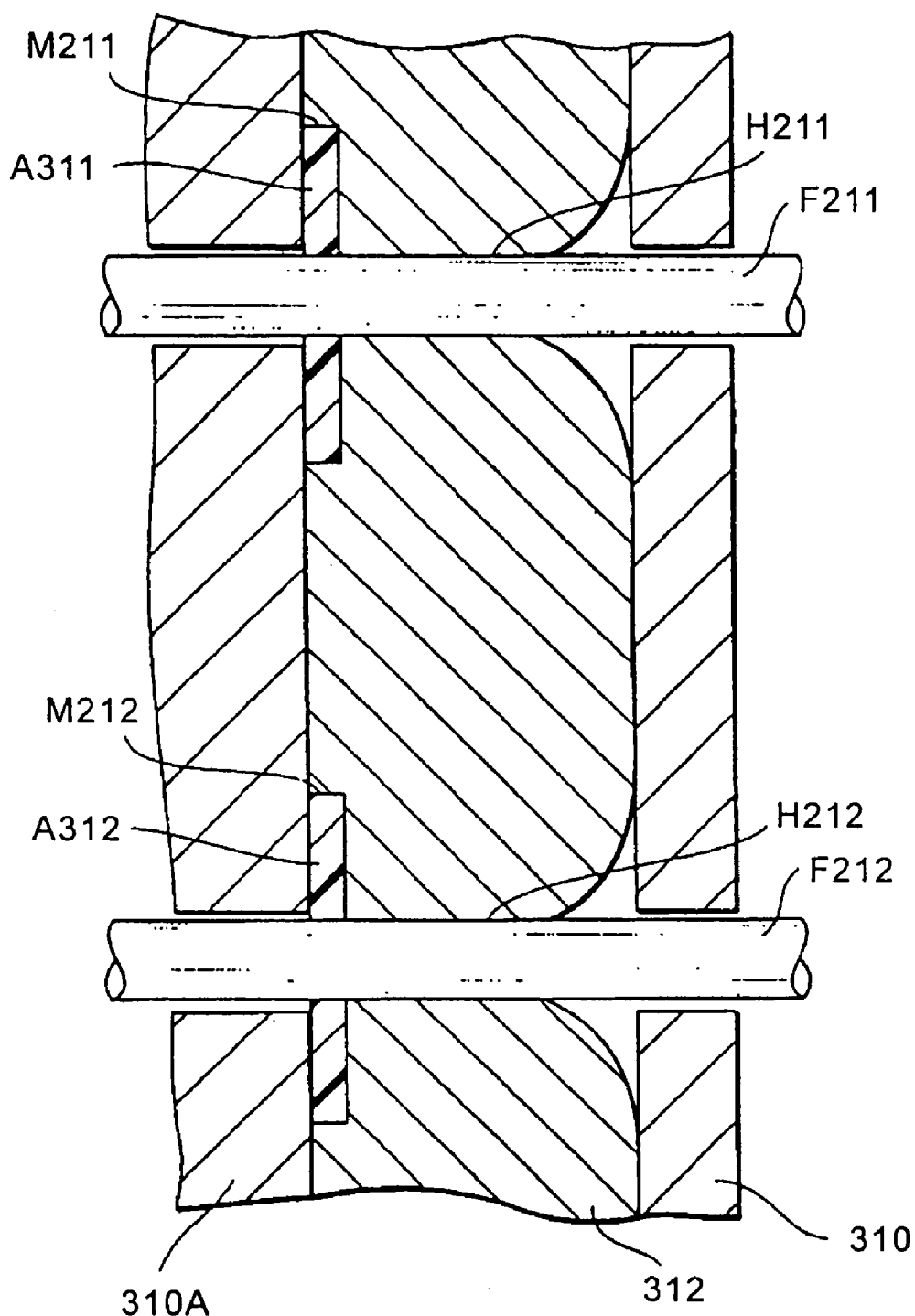
FIG. 34 is an enlarged cross sectional view showing the optical fiber adhesion regions.
Figure 35:
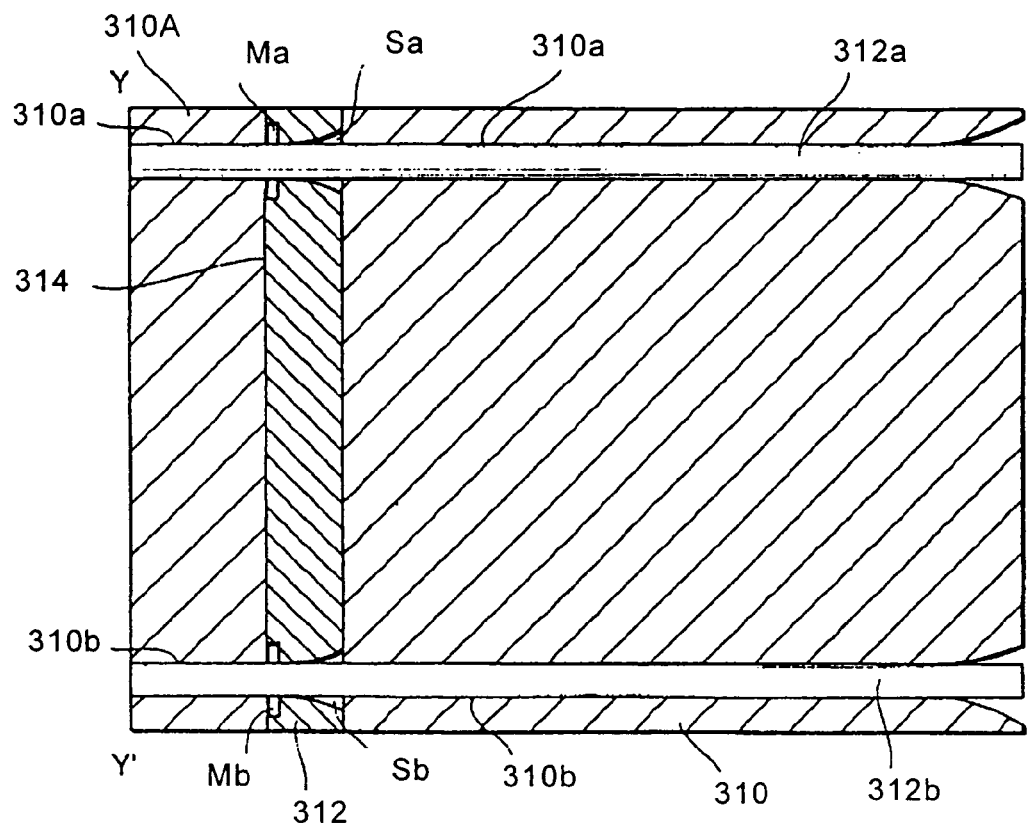
FIG. 35 is a cross sectional view taken along line Y–Y' shown in FIG. 32.

FIG. 32 shows a two-dimensional optical fiber array according to the fifth embodiment of the invention. The cross sectional view taken along line X–X' in FIG. 32 is shown in FIG. 33, and the cross sectional view taken along line Y–Y' in FIG. 32 is shown in FIG. 35. FIG. 34 is a partially enlarged diagram of FIG. 33.

An optical fiber holder 310 is, for example, a rectangular prism and is made of ceramics, metal, plastics or the like. In the holder 310, circular optical fiber holding holes J311 to J348 are disposed in a matrix shape, extending substantially in parallel through the holder 310 from its one end face (left end face) to the opposing end face (right end face), and circular positioning pin inserting holes 310a and 310b are disposed extending substantially in parallel through the holder 310 from its one end face to the opposing end face. The pin inserting holes 310a and 310b are substantially in parallel to the holding holes J311 to J348. The diameters of the holding holes J311 to J348 and pin inserting holes 310a and 310b increase near at the opposing end face of the holder 310 as shown in FIGS. 33 and 35.

A positioning plate inserting groove 314 is formed in the holder 310 near at its one end, crossing the holding holes J311 to J348 and pin inserting holes 310a and 310b substantially at a right angle. A holder section 310A is defined between one end face of the holder 310 and the plate inserting groove 314. An optical fiber positioning (fixing) plate 312 is inserted into the plate inserting groove 314. The positioning plate 312 is, for example, of a rectangle shape corresponding to the cross section of the holder 310 perpendicular to the longitudinal direction, and is made of a metal plate of Ni—Fe alloy or the like. In the positioning plate 312, thirty two optical fiber positioning holes corresponding to the holding holes J311 to J348 of the holder 310 are disposed extending through the positioning plate 312 from one principal surface to the opposing principal surface. In FIG. 33, of the thirty two positioning holes of the positioning plate 312, four positioning holes H211, H221, H231 and H241 are shown. As shown in FIG. 35, in the positioning plate 312, positioning pin inserting holes Sa and Sb corresponding to the pin inserting holes 310a and 310b of the holder 310 are disposed.

Each of the positioning holes H211, H221, H231 and H241 shown in FIG. 33 as well as the other positioning holes of the positioning plate 312 increases its diameter toward the other principal surface. The positioning plate 312 is inserted into the plate inserting groove 314, with the other principal surface being directed to the other end face of the holder 310. As shown in FIG. 33, adhesion holes M211, M221, M231 and M241 are formed on one principal surface of the positioning plate 312, being continuous with the smaller size opening ends of the positioning holes H211, H221, H231 and H241. Similar adhesion holes are formed continuous with the smaller size opening ends of the other positioning holes. Each of the adhesion holes M211, . . . has a larger diameter than that of the corresponding positioning hole.

As shown in FIG. 35, adhesion holes Ma and Mb are formed on one principal surface of the positioning plate 312 to be continuous with the smaller size opening ends of the pin inserting holes Sa and Sb. The adhesion holes Ma and Mb have a diameter larger than the corresponding pin inserting holes.

Positioning pins 312a and 312b are inserted from the other end face of the holder 310 into the pin inserting holes 310a and Sa, and 310b and Sb. For example, the positioning pins 312a and 312b are made of metal such as stainless steel or ceramics such as alumina and have a diameter of about 1 mm. Since the pins are inserted into the pin inserting holes 310a, 310b, Sa and Sb from the larger size opening ends, the insertion work is easy. The positioning pins 312a and 312b are fixed to the positioning plate 312 and holder 310 with adhesive in the adhesion holes Ma and Mb in the manner similar to optical fiber adhesion as will be later described with FIG. 34. The position of the positioning plate 312 can be precisely aligned with the holder 310 in such a manner that each positioning hole communicates with the corresponding holding hole.

In this position alignment state, as shown in FIG. 33 optical fibers F311, F321, F331 and F341 are inserted from the other end face of the holder 310 into a communication hole of the holding hole J311 and positioning hole H211, a communication hole of the holding hole J321 and positioning hole H221, a communication hole of the holding hole J331 and positioning hole H231, and a communication hole of the holding hole J341 and positioning hole H241. Other optical fibers are inserted also into other communication holes of the other holding holes and positioning holes. Since the optical fiber is inserted into the holding hole and positioning hole from the larger size opening ends, the insertion work is easy. Each optical fiber is adhered and fixed to the holder 310 with adhesive in the adhesion hole.

FIG. 34 shows the adhesion/fixation structure near the adhesion holes M211 and M221. Before the positioning plate 312 is inserted into the plate inserting groove 314, UV hardening adhesive is filled in the adhesion holes M211 and M221. The optical fibers F311 and F321 are inserted into the holes H211 and M211 and holes H221 and M221, thereafter UV rays are irradiated to the adhesion layers A311 and A321 in the adhesion holes M211 and M221 via the optical fibers F311 and F322 to harden the adhesive layers A311 and A321. The optical fibers F311 and F321 along with the positioning plate are fixed to the holder 310 by the adhesion layers A311 and A321.

Next, with reference to FIGS. 36 to 41, a method of manufacturing the optical fiber array of this embodiment will be described. In FIGS. 36 to 41, like elements to those shown in FIGS. 32 to 35 are represented by using identical reference symbols and the description thereof is omitted.

Figure 36:
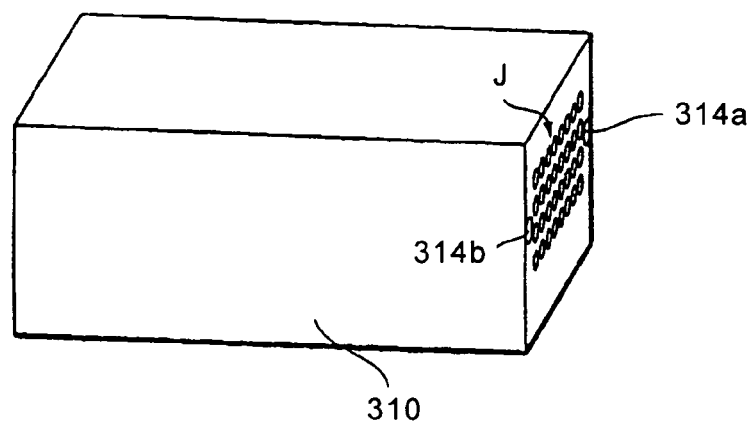
FIG. 36 is a perspective view illustrating a holder forming process in an example of a method of manufacturing the optical fiber array shown in FIG. 32.

In the process shown in FIG. 36, the optical fiber holder 310 having the holding hole group including the holding holes J311 to J342 and the positioning pin inserting holes 310a and 310b is formed by a baking process of, for example, zirconia powders.

Figure 37:
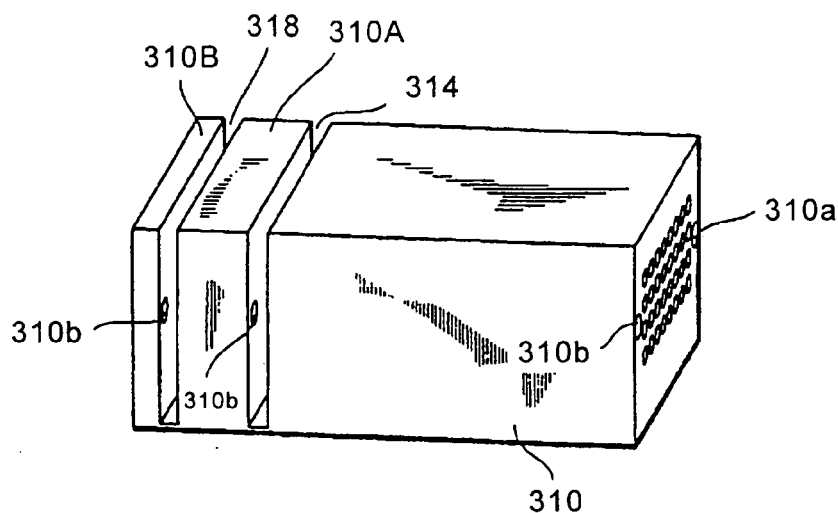
FIG. 37 is a perspective view illustrating a plate insertion groove forming process following the process shown in FIG. 36.

In the process shown in FIG. 37, two juxtaposed dicing grooves are formed rear one end face of the holder 310 with a dicing blade having a width of 100 μm to 200 μm. The two dicing grooves are used as positioning plate inserting grooves 314 and 318. The pin inserting holes 310a and 310b are cut by the plate inserting grooves 314 and 318. A holder section 310B is left between one end face of the holder 310 and the plate inserting groove 318, and a holder section 310A is left between the plate inserting grooves 318 and 314.

Figure 38:
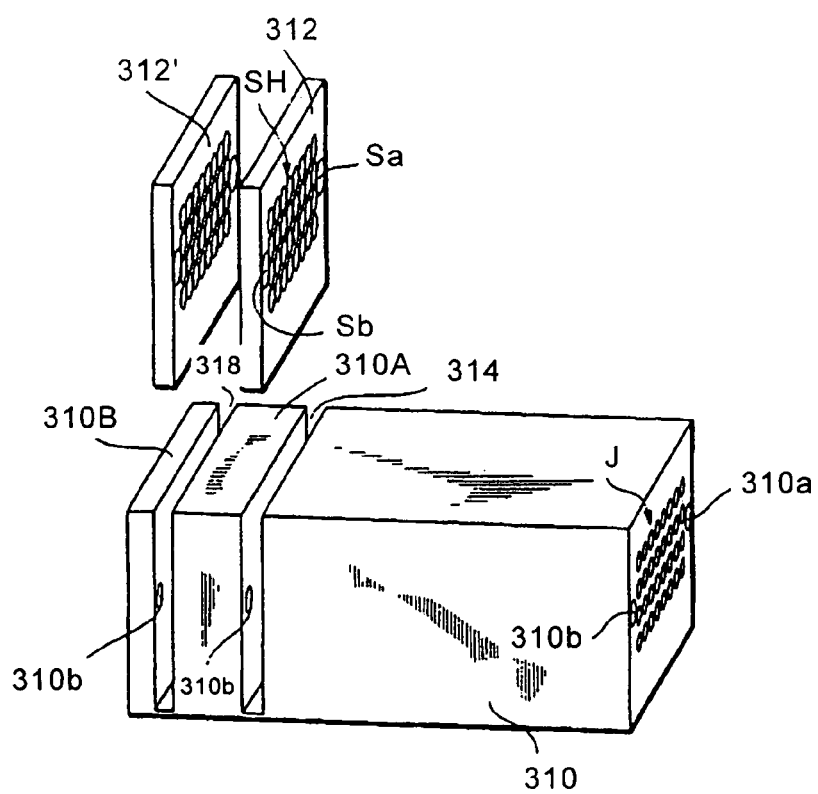
FIG. 38 is a perspective view illustrating a positioning plate inserting process following the process shown in FIG. 37.

In the process shown in FIG. 38, optical fiber positioning plates 312 and 312' formed by thin film processes shown in FIGS. 25 to 29 are prepared. As described earlier, the positioning plate 312 has the adhering/positioning hole group HM including the optical fiber positioning holes H211 to H241, etc. and adhesion holes M211 to M241, etc. and the positioning pin inserting holes Sa and Sb. The positioning plate 312' has the same structure as that of the positioning plate 312.

Figure 39:
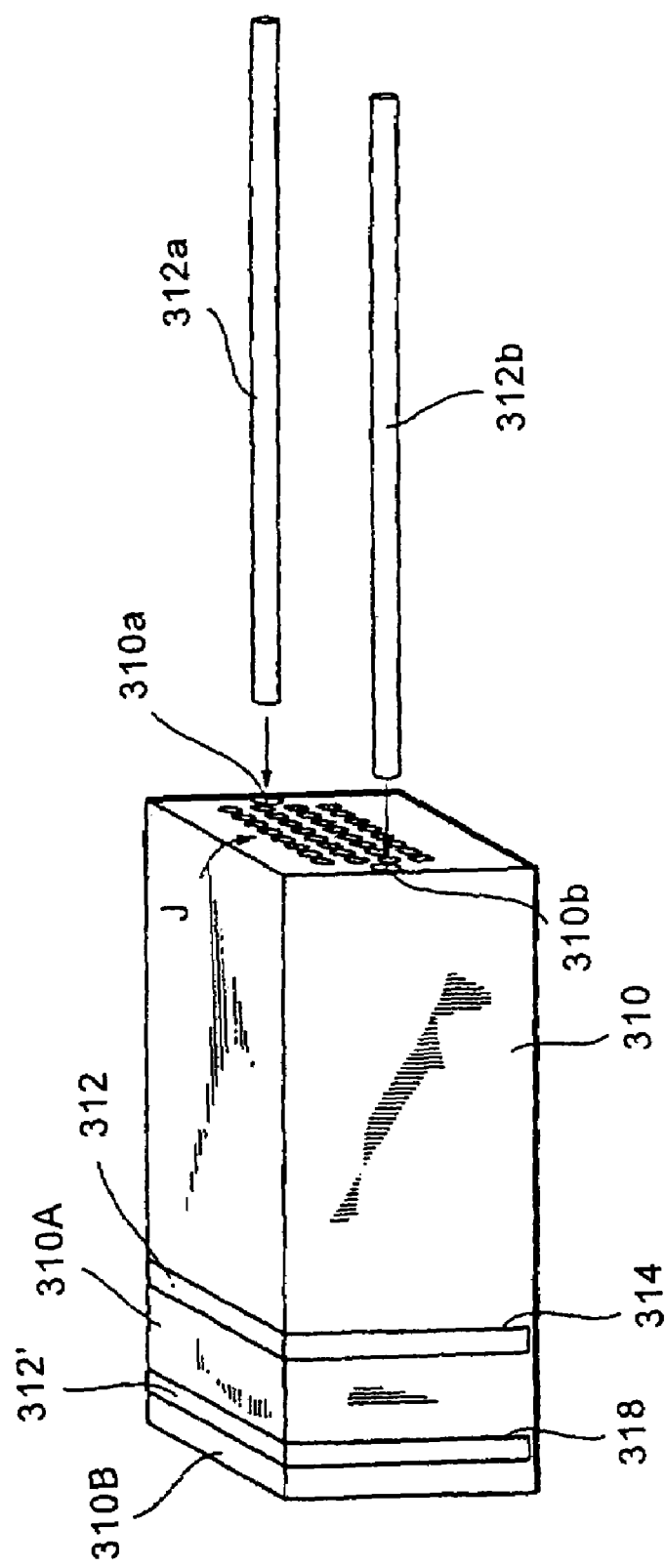
FIG. 39 is a perspective view illustrating a pin inserting-fixing process following the process shown in FIG. 38.

Next, the positioning plates 312 and 312' are inserted into the plate inserting holes 314 and 318. In this case, as shown in FIGS. 33 and 35, the positioning plate 312 is inserted into the plate inserting groove 314 in such a manner that the larger side opening ends of the positioning holes H211, etc. and the pin inserting holes Sa, etc. are directed toward the opposing end face (right end face) of the holder 310. The positioning plate 312' is also inserted in this manner. FIG. 39 shows the state of the inserted positioning plates 312 and 312'.

In the process shown in FIG. 39, in the state that the positioning plates 312 and 312' are inserted into the plate inserting grooves 314 and 318, the positioning pins 312a and 312b are inserted from the opposing end face of the holder 310 into the pin inserting holes 310a and 310b. As described earlier with FIG. 35, the positioning pins 312a and 312b are inserted via the pin inserting holes 310a and 310b into the pin inserting holes Sa and Sb of the positioning plate 312 and into the holder section 310A, positioning plate 312' and holder section 310B, and fixed at the adhesion holes as described earlier. The positions of the positioning plates 312 and 312' are therefore set relative to the holder 310.

Figure 40:
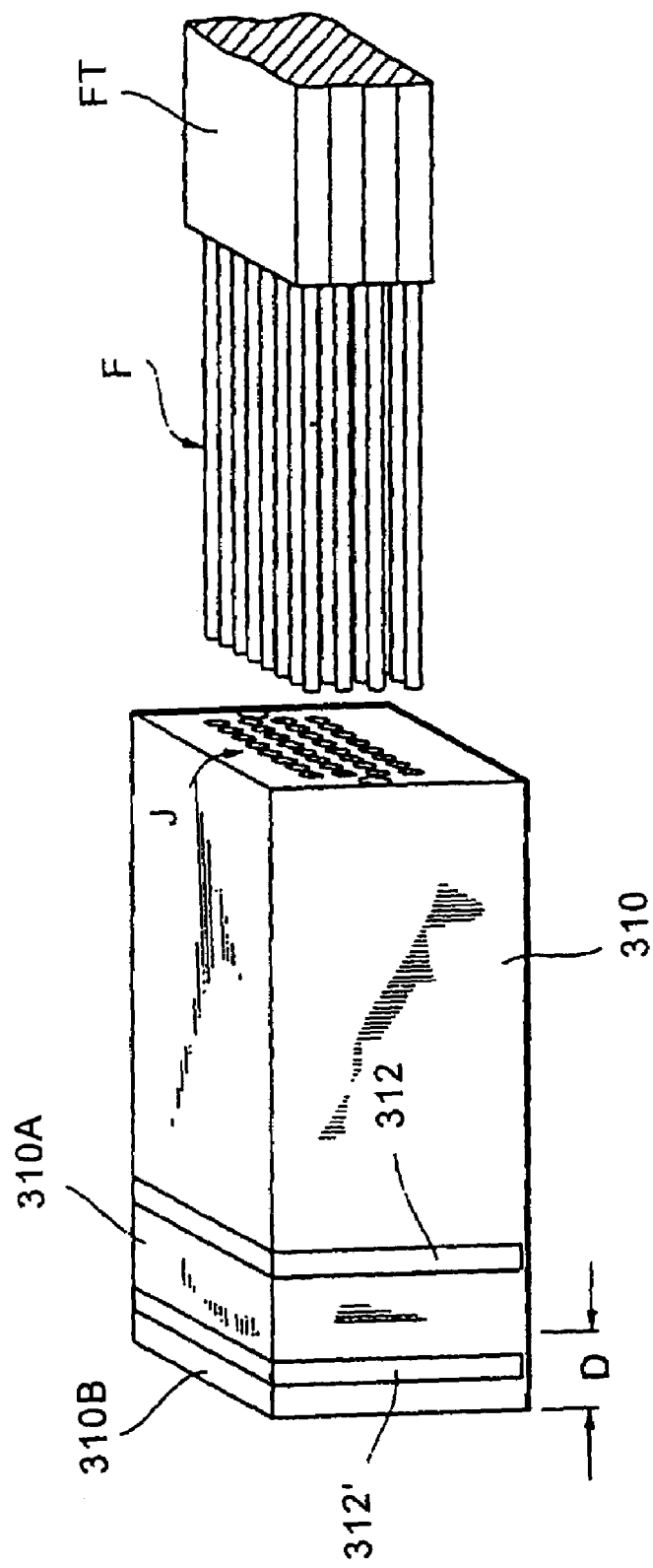
FIG. 40 is a perspective view illustrating an optical fiber inserting-fixing process following the process shown in FIG. 39.
Figure 41:
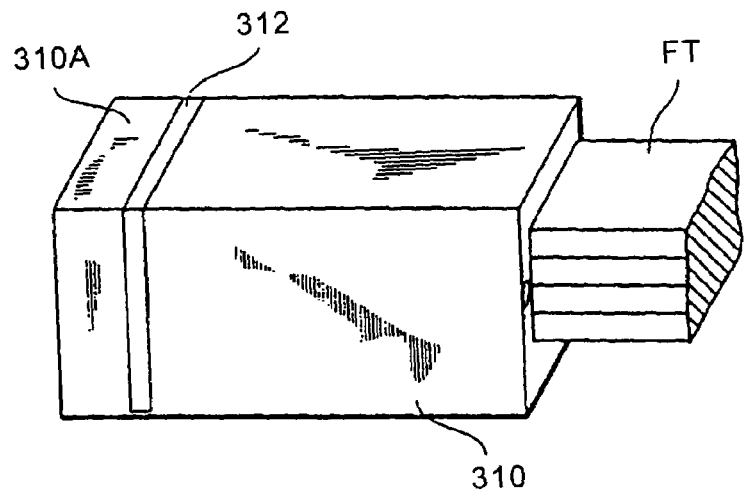
FIG. 41 is a perspective view illustrating a polishing process following the process shown in FIG. 40.

In the process shown in FIG. 40, in the position alignment state described above, each optical fiber in an optical fiber group F extending from a fiber tape FT is inserted from the opposing end face of the holder 310 into the holding hole of the holder 310, the positioning hole of the positioning plate 312, the holding hole of the holder section 310A, the positioning hole of the positioning plate 312', and the holding hole of the holder section 310B, and fixed to the holder 310 in the adhesion holes as described earlier. FIG. 41 shows the insertion/fixation state of the optical fiber group F in the holder 310.

In the process shown in FIG. 41, the optical fibers protruded out of one end face of the holder 310 and the end face of the holder 310 are subjected to a polishing process to remove the holder section D from one end face of the holder 310 to a region in the holder section 310A shown in FIG. 40. As a result, the end face of the holder section 310A is planarized as shown in FIG. 32 and the positioning plate 312 is left. As a polishing process, a slant polishing process may be used if necessary.

In the example described above, although the polishing process is performed to the region in the holder section 310A, it may be stopped in the region of the holder section 310B. In this case, both the positioning plates 312 and 312' are left. One of the positioning plates 312 and 312' may be omitted.

Figure 42:
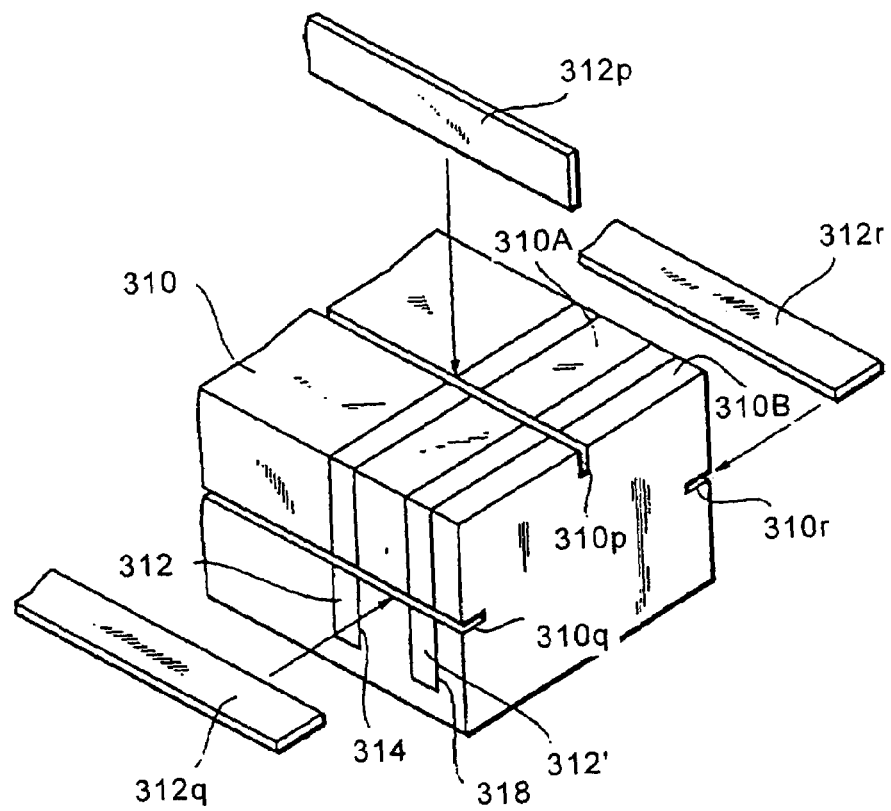
FIG. 42 is a perspective view illustrating a modification of the method of aligning the positions of the holder and positioning plate.
Figure 43:
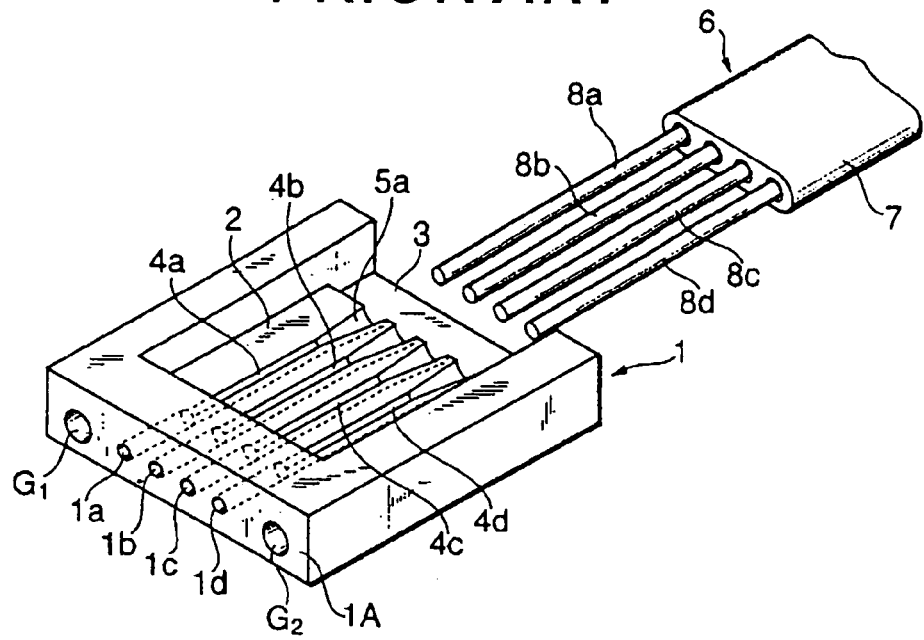
FIG. 43 is a perspective view showing an example of a conventional multi optical fiber holder.
Figure 44:
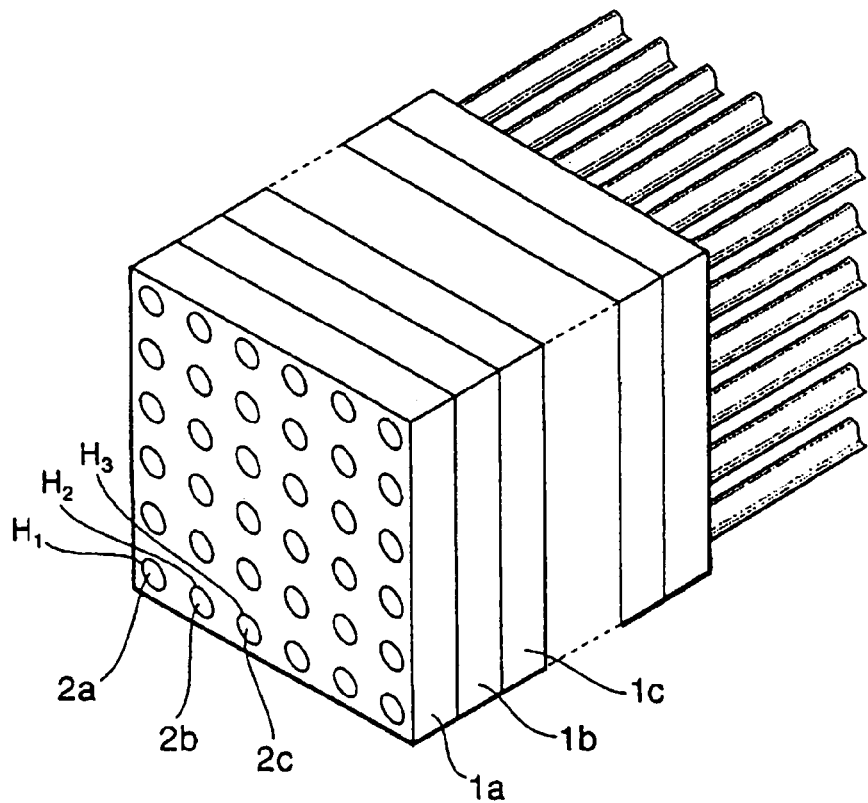
FIG. 44 is a perspective view showing an example of a conventional two-dimensional optical fiber array.

FIG. 42 illustrates a modification of position alignment of the holder and positioning plate. In FIG. 42, like elements to those shown in FIGS. 32 to 35 are represented by using identical reference symbols and the description thereof is omitted.

In the example shown in FIG. 42, positioning pin inserting grooves 310p, 310q and 310r are formed extending from one end face toward the opposing end face (or extending from one end face and reaching the opposing end face) on the top and both sides of the holder 310. The pin inserting grooves 310p to 310r extend from one end face of the holder section 310B toward the opposing end face of the holder 310 via the positioning plate 312', holder section 310A and positioning plate 312.

For position alignment, the positioning plates 312 and 312' are inserted into the plate inserting grooves 314 and 318 of the holder 310 as shown in FIG. 42. Thereafter, plate-like positioning pins 312p, 312q and 312r are inserted into the pin inserting grooves 310p, 310q and 310r as indicated by arrows in FIG. 42, and fixed with adhesion. In this fixation state, an optical fiber insertion work similar to that described earlier is performed. The positioning pins protruded from the holder 310 (including the holder sections 310A and 310B) and positioning plates 312 and 312 are removed by a polishing process or the like.

In the fifth embodiment and its modification, the positions of the positioning plates 312 and 312' can be set precisely relative to the holder 310 by using the positioning pins 312a and 312b or 312p to 312r. Since the positioning plates 312 and 312' are inserted into the plate inserting grooves 314 and 318, they are not likely to be warped or slipped. The precision of the diameter of each positioning hole of the positioning plate relative to the diameter of an optical fiber is 1 μm or smaller. Therefore, the position alignment at the end face of an optical fiber can be set highly precisely and parallelism of optical fibers can be set to 0.1 degree or smaller.

The optical fiber positioning plate 312 shown in FIGS. 33 to 35 can be manufactured by a method similar to that used for the optical fiber positioning plate 212 shown in FIGS. 25 to 29. The adhesion holes M211 to M241, Ma and Mb of the optical fiber positioning plate 312 shown in FIGS. 33 to 35 may be omitted. In this case, the optical fiber positioning plate 312 can be manufactured by a method similar to that used for the positioning plate 212 shown in FIGS. 21 to 24.

With the above-described optical fiber positioning plate manufacture method, the position and size of each of the holes H211 to H218, M211 to M216, and H21 to H28 and the positioning hole pitch can be set at a submicron precision, e.g., 0.5 μm. In the positioning plate 312, the holes H211 to H218, holes M211 to M216 and holes H21 to H28 are disposed one-dimensionally. The positioning holes and adhesion holes disposed two-dimensionally may be formed by a similar method. The pin inserting holes Sa and Sb and adhesion holes Ma and Mb shown in FIG. 35 can be formed by a method similar to that used for the positioning holes H211 to H218 and adhesion holes M211 to M216. The pin inserting holes Sa and Sb without the adhesion holes may be formed if necessary by a method similar to that used for the positioning holes H21 to H28.

The present invention has been described in connection with the preferred embodiments. The invention is not limited only to the above embodiments. It is apparent that various modifications, improvements, combinations, and the like can be made by those skilled in the art. For example, the following modifications are possible:

(1) The shape of the optical fiber holder 310 is not limited only to a rectangular prism, but it may be a cylinder, a polygonal prism (e.g., a triangular prism and a hexagonal prism), and the like.

(2) The shape of each of the holding hole and pin inserting hole of the optical fiber holder 310 and the shape of each of the positioning hole and pin inserting hole of the positioning plate 312, 312' are not limited only to a circle, but they may be a polygon (e.g., a triangle, a square, a parallelogram, and a hexagon) and the like. If the pin inserting hole of the holder 310 and positioning plates 312 and 312' has a polygon shape, the positioning pin has the same polygon shape. In this case, since the positioning pin does not rotate, a single positioning pin may be used.

(3) The invention is not limited only to a two-dimensional optical fiber array, but it may be applied to a one-dimensional optical fiber array and a single optical fiber holder (position alignment of one optical fiber).

What are claimed are:

1. An optical fiber array comprising:
   one or a plurality of optical fibers to be aligned in position;
   an optical fiber holder having an optical fiber holding hole corresponding to each optical fiber to be aligned in position, the optical fiber holding hole being formed through said optical fiber holder from one end face to an opposing end face thereof;
   a first positioning plate having a first optical fiber positioning hole corresponding to each optical fiber holding hole of said optical fiber holder, the first optical fiber positioning hole being formed through said first positioning plate from one principal surface to an opposing principal surface thereof and increasing in size toward the opposing principal surface, said first positioning plate being mounted on the end face of said optical fiber holder with the first optical fiber positioning hole being communicated with a corresponding optical fiber holding hole of said optical fiber holder at the opposing principal surface;
   a second positioning plate having a second optical fiber positioning hole corresponding to each optical fiber holding hole of said optical fiber holder, the second optical fiber positioning hole being formed through said second positioning plate from one principal surface to an opposing principal surface thereof and increasing in size toward the opposing principal surface, said second positioning plate being mounted on the opposing end face of said optical fiber holder with the second optical fiber positioning hole being communicated with a corresponding optical fiber holding hole of said optical fiber holder at the principal surface; and
   fixing means for adhering each optical fiber to at least one of said first and second positioning plates in a state that said first and second positioning plates are mounted on the end face and opposing end face of said optical fiber holder and each optical fiber is inserted into a corresponding second optical fiber positioning hole of said second positioning plate, a corresponding optical fiber holding hole of said optical fiber holder and a corresponding first optical fiber positioning hole of said first positioning plate, and
   wherein at least one of said first and second optical fiber positioning holes has a sidewall having a radius (R) portion at one end, at which end a diameter of the hole is increased, when the sidewall is viewed from a cross section parallel to a piercing direction of the optical fiber holding hole; and
   wherein said first and second positioning plates each have a thickness of no more than 80 μm.

2. An optical fiber positioning method comprising steps of:
   preparing one or a plurality of optical fibers to be aligned in position;
   providing an optical fiber holder having an optical fiber holding hole corresponding to each optical fiber to be aligned in position, the optical fiber holding hole being formed through the optical fiber holder from one end face to an opposing end face thereof;
   forming, by plating, a first positioning plate having a first optical fiber positioning hole corresponding to each optical fiber holding hole of the optical fiber holder, the first optical fiber positioning hole being formed through the first positioning plate from one principal surface to an opposing principal surface thereof and increasing in size toward the opposing principal surface, wherein said first optical fiber positioning hole has a sidewall with a radius (R) portion at one end, at which end a diameter of the hole is increased, when the sidewall is viewed from a cross section parallel to a piercing direction of the optical fiber holding hole;
   forming, by plating, a second positioning plate having a second optical fiber positioning hole corresponding to each fiber holding hole of said optical fiber holder, the second optical fiber positioning hole being formed through said second positioning plate from one principal surface to an opposing principal surface thereof and increasing in size toward the opposing principal surface, wherein said second optical fiber positioning hole has a sidewall having a radius (R) portion at one end, at which end a diameter of the hole is increased, when the sidewall is viewed from a cross section parallel to a piercing direction of the second optical fiber holding hole;
   mounting the first positioning plate on the end face of the optical fiber holder with the first optical fiber positioning hole being communicated with a corresponding optical fiber holding hole of the optical fiber holder at the opposing principal surface, and mounting a second positioning plate on the opposing end face of the optical fiber holder with the second optical fiber positioning hole being communicated with a corresponding optical fiber holding hole of said optical fiber holder at the principal surface; and
   in a state that the first and second positioning plates are mounted on the end face and opposing end face of the optical fiber holder, adhering each optical fiber to at least one of said first and second positioning plates by inserting each optical fiber from a corresponding second optical fiber positioning hole of the second positioning plate, and via a corresponding optical fiber holding hole of the optical fiber holder into a corresponding first optical fiber positioning hole of the first positioning plate.

3. An optical fiber positioning method according to claim 2, wherein:
   said preparing step prepares a guide plate having an optical fiber guiding hole corresponding to each second optical fiber positioning hole of the second positioning plate, each optical fiber guiding hole being formed through the guide plate from one principal surface to an opposing principal surface thereof and having a size larger than a corresponding second optical fiber positioning hole of the second positioning plate;
   said mounting step mounts the guide plate on the second positioning plate with the optical fiber guiding hole of the guide plate being communicated with a corresponding second optical fiber positioning hole of the second positioning plate at the opposing principal surface; and
   said inserting step inserts each optical fiber into a corresponding second optical fiber positioning hole of the second positioning plate via a corresponding optical fiber guiding hole of the guide plate in a state that the guide plate is mounted on the second positioning plate.

4. An optical fiber positioning plate to be mounted on one end face of an optical fiber holder having one or a plurality of optical fiber holding holes, the optical fiber positioning plate comprising:
- a first optical fiber positioning hole corresponding to each optical fiber holding hole of the optical fiber holder, each optical fiber positioning hole being formed through the optical fiber positioning plate from one principal surface to an opposing principal surface thereof and increasing in size toward the opposing principal surface,
- wherein a sidewall of each optical fiber holding hole has a radius (R) portion at one end, at which end a diameter of the hole is increased, when the sidewall is viewed from a cross section parallel to a piercing direction of the optical fiber holding hole; and
- wherein the optical fiber positioning plate has a thickness of no more than 80 μm.

5. An optical fiber array, comprising:
- one or a plurality of optical fibers to be aligned in position;
- an optical fiber holder having an optical fiber holding hole corresponding to each optical fiber to be aligned in position, the optical fiber holding hole being formed through said optical fiber holder from one end face to an opposing end face thereof;
- at least one positioning plate having a first optical fiber positioning hole corresponding to each optical fiber holding hole of said optical fiber holder, the first optical fiber positioning hole being formed through said positioning plate from one principal surface to an opposing principal surface thereof and increasing in size toward the opposing principal surface, wherein a sidewall of each optical fiber holding hole has a radius (R) portion at one end, at which end a diameter of the hole is increased, when the sidewall is viewed from a cross section parallel to a piercing direction of the optical fiber holding hole, said positioning plate being mounted on the end surface of said optical fiber holder with the first optical fiber positioning hole being communicated with a corresponding optical fiber holding hole of said optical fiber holder at the opposing principal surface, said positioning plate having a thickness of no more than 80 μm; and
- fixing means for adhering each optical fiber to said positioning plate in a state that said positioning plate is mounted on the end face of said optical fiber holder and each optical fiber is inserted into a corresponding optical fiber holding hole of said optical fiber holder and a corresponding first optical fiber positioning hole of said positioning plate.

6. An optical fiber positioning method, comprising steps of:
- preparing one or a plurality of optical fibers to be aligned in position;
- providing an optical fiber holder having an optical fiber holding hole corresponding to each optical fiber to be aligned in position, the optical fiber holding hole being formed through said optical fiber holder from one end face to an opposing end face thereof;
- forming, by plating, at least one positioning plate having a first optical fiber positioning hole corresponding to each fiber holding hole of the optical fiber holder, the first optical fiber positioning hole being formed through the positioning plate from one principal surface to an opposing principal surface thereof and increasing in size toward the opposing principal surface, wherein a sidewall of each optical fiber holding hole has a radius (R) portion at one end, at which end a diameter of the hole is increased, when the sidewall is viewed from a cross section parallel to a piercing direction of the optical fiber holding hole;
- mounting the positioning plate on the end surface of said optical fiber holder with the first optical fiber positioning hole being communicated with a corresponding optical fiber holding hole of the optical fiber holder at the opposing principal surface; and
- in a state that the positioning plate is mounted on the end face of the optical fiber holder, adhering each optical fiber to said positioning plate by inserting each optical fiber into a corresponding optical fiber holding hole of the optical fiber holder and a corresponding first optical fiber positioning hole of the positioning plate.

7. An optical fiber array comprising:
- one or a plurality of optical fibers to be aligned in position;
- an optical fiber holder having an optical fiber holding hole corresponding to each optical fiber to be aligned in position, the optical fiber holding hole being formed through said optical fiber holder from one end face to an opposing end face thereof;
- a first positioning plate having a first optical fiber positioning hole corresponding to each optical fiber holding hole of said optical fiber holder, the first optical fiber positioning hole being formed through said first positioning plate from one principal surface to an opposing principal surface thereof and increasing in size toward the opposing principal surface, said first positioning plate being mounted on the end face of said optical fiber holder with the first optical fiber positioning hole being communicated with a corresponding optical fiber holding hole of said optical fiber holder at the opposing principal surface;
- a second positioning plate having a second optical fiber positioning hole corresponding to each optical fiber holding hole of said optical fiber holder, the second optical fiber positioning hole being formed through said second positioning plate from one principal surface to an opposing principal surface thereof and increasing in size toward the opposing principal surface, said second positioning plate being mounted on the opposing end face of said optical fiber holder with the second optical fiber positioning hole being communicated with a corresponding optical fiber holding hole of said optical fiber holder at the principal surface; and
- a plated layer formed for fixing each optical fiber to at least one of said first and second positioning plates in a state that said first and second positioning plates are mounted on the end face and opposing end face of said optical fiber holder and each optical fiber is inserted into a corresponding second optical fiber positioning hole of said second positioning plate, a corresponding optical fiber holding hole of said optical fiber holder and a corresponding first optical fiber positioning hole of said first positioning plate,
- wherein said first and second positioning plates each have a thickness of no more than 80 μm.

8. An optical fiber positioning method, said method comprising steps of:
- preparing one or a plurality of optical fibers to be aligned in position;
- providing an optical fiber holder having an optical fiber holding hole corresponding to each optical fiber to be aligned in position, the optical fiber holding hole being formed through the optical fiber holder from one end face to an opposing end face thereof;

forming, by plating, a first positioning plate having a first optical fiber positioning hole corresponding to each optical fiber holding hole of the optical fiber holder, the first optical fiber positioning hole being formed through the first positioning plate from one principal surface to an opposing principal surface thereof and increasing in size toward the opposing principal surface, wherein said first optical fiber positioning hole has a sidewall with a radius (R) portion at one end, at which end a diameter of the hole is increased, when the sidewall is viewed from a cross section parallel to a piercing direction of the optical fiber holding hole;

forming, by plating, a second positioning plate having a second optical fiber positioning hole corresponding to each optical fiber holding hole of the optical fiber holder, the second optical fiber positioning hole being formed though the second positioning plate from one principal surface to an opposing principal surface thereof and increasing in size toward the opposing principal surface, wherein said second optical fiber positioning hole has a sidewall with a radius (R) portion at one end, at which end a diameter of the hole is increased, when the sidewall is viewed from a cross section parallel to a piercing direction of the optical fiber holding hole;

mounting the first positioning plate on the end face of the optical fiber holder with the first optical fiber positioning hole being communicated with a corresponding optical fiber hole of the optical fiber holder at the opposing principal surface, and mounting the second positioning plate on the opposing end face of the optical fiber holder with the second optical fiber positioning hole being communicated with a corresponding optical fiber holding hole of said optical fiber holder at the principal surface;

in a state that the first and second positioning plates are mounted on the end face and opposing end face of the optical fiber holder, inserting each optical fiber from a corresponding second optical fiber positioning hole of the second positioning plate, and via a corresponding optical fiber holding hole of the optical fiber holder into a corresponding first optical fiber positioning hole of the first positioning plate; and forming a plated layer for fixing each of said inserted optical fiber to at least one of said first and second positioning plates;

wherein each of said first and second optical fiber holding holes has a sidewall with a radius (R) portion at one end, at which end a diameter of the hole is increased, when the sidewall is viewed from a cross section parallel to a piercing direction of the optical fiber holding hole.

* * * * *